US012149882B2

(12) United States Patent
Hoang et al.

(10) Patent No.: US 12,149,882 B2
(45) Date of Patent: *Nov. 19, 2024

(54) HEARING DEVICE COMPRISING A NOISE REDUCTION SYSTEM

(71) Applicant: Oticon A/S, Smørum (DK)

(72) Inventors: Poul Hoang, Smørum (DK); Jan M. De Haan, Smørum (DK); Jesper Jensen, Smørum (DK); Michael Syskind Pedersen, Smørum (DK)

(73) Assignee: Oticon A/S, Smørum (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/507,930

(22) Filed: Nov. 13, 2023

(65) Prior Publication Data

US 2024/0089651 A1 Mar. 14, 2024

Related U.S. Application Data

(63) Continuation of application No. 17/982,687, filed on Nov. 8, 2022, now Pat. No. 11,856,357, which is a (Continued)

(30) Foreign Application Priority Data

Sep. 11, 2019 (EP) .................................... 19196675

(51) Int. Cl.

*H04R 1/10* (2006.01)
*G10K 11/178* (2006.01)
*H04R 25/00* (2006.01)

(52) U.S. Cl.

CPC ..... *H04R 1/1083* (2013.01); *G10K 11/17837* (2018.01); *H04R 1/1016* (2013.01); (Continued)

(58) Field of Classification Search

CPC ..... G10K 2210/1081; G10K 11/17837; H04R 1/1083; H04R 2460/01; H04R 1/1016; H04R 25/505

(Continued)

(56) References Cited

U.S. PATENT DOCUMENTS

2011/0305345 A1 12/2011 Bouchard et al.
2013/0144622 A1 6/2013 Yamada et al.

(Continued)

FOREIGN PATENT DOCUMENTS

EP 2 701 145 A1 2/2014
WO WO 2017/134300 A1 8/2017

OTHER PUBLICATIONS

Bell et al., "A Bayesian Approach to Robust Adaptive Beamforming," IEEE Transactions on Signal Processing, vol. 48, No. 2, Feb. 2000, pp. 386-398.

(Continued)

*Primary Examiner* — Paul Kim

(74) *Attorney, Agent, or Firm* — Birch, Stewart, Kolasch & Birch, LLP

(57) ABSTRACT

A hearing device adapted for being located at or in an ear of a user, or for being fully or partially implanted in the head of a user comprises a) an input unit for providing at least one electric input signal representing sound in an environment of the user, said electric input signal comprising a target speech signal from a target sound source and additional signal components, termed noise signal components, from one or more other sound sources, b) a noise reduction system for providing an estimate of said target speech signal, wherein said noise signal components are at least partially attenuated, and c) an own voice detector for repeatedly estimating whether or not, or with what probability, said at least one electric input signal, or a signal derived therefrom, com- (Continued)

prises speech originating from the voice of the user. The noise signal components are identified during time segments wherein the own voice detector indicates that the at least one electric input signal, or a signal derived therefrom, originates from the voice of the user, or originates from the voice of the user with a probability above an own voice presence probability (OVPP) threshold value. A method of operating a hearing device is further disclosed.

17 Claims, 12 Drawing Sheets

Related U.S. Application Data continuation of application No. 17/017,092, filed on Sep. 10, 2020, now Pat. No. 11,533,554.

(52) U.S. Cl.
CPC ... *H04R 25/505* (2013.01); *G10K 2210/1081* (2013.01); *H04R 2460/01* (2013.01)

(58) Field of Classification Search
USPC .................................................. 381/71.1, 312
See application file for complete search history.

(56) References Cited

U.S. PATENT DOCUMENTS

2014/0093091 A1* 4/2014 Dusan .................. H04R 1/1083 381/74
2017/0256272 A1 9/2017 Kamkar Parsi et al.

OTHER PUBLICATIONS

Gu et al., "Robust Adaptive Beamforming Based on Interference Covariance Matrix Reconstruction and Steering Vector Estimation," IEEE Transactions on Signal Processing, vol. 60, No. 7, Jul. 2012, pp. 3881-3885.
Hendriks et al., "Estimation of the Noise Correlation Matrix," ICASSP 2011, pp. 4740-4743.
Jensen et al., "Analysis of Beamformer Directed Single-Channel Noise Reduction System for Hearing Aid Applications," ICASSP 2015, pp. 5728-5732.
Kjems et al., "Maximum Likelihood Based Noise Covariance Matrix Estimation for Multi-Microphone Speech Enhancement," 20th European Signal Processing Conference (EUSIPCO 2012), Bucharest, Romania, Aug. 27-31, 2012, pp. 295-299.
Kuklasinski et al., "Multi-Channel PSD Estimators for Speech Dereverberation—A Theoretical and Experimental Comparison," ICASSP 2015, pp. 91-95.
Simmer et al., "3 Post-Filtering Techniques," Microphone Arrays: Signal Processing Techniques, 2001, pp. 39-45.
Souden et al., "An Integrated Solution for Online Multichannel Noise Tracking and Reduction," IEEE Transactions on Audio, Speech, and Language Processing, vol. 19, No. 7, Sep. 2011, pp. 2159-2169.
Ye et al., "Maximum Likelihood DOA Estimation and Asymptotic Cramér-Rao Bounds for Additive Unknown Colored Noise," IEEE Transactions on Signal Processing, vol. 43, No. 4, Apr. 1995, pp. 938-949.
Zohourian et al., "Binaural Speaker Localization Integrated Into an Adaptive Beamformer for Hearing Aids," IEEE/ACM Transactions on Audio, Speech, and Language Processing, vol. 26, No. 3, Mar. 2018, pp. 515-528.

* cited by examiner

HEARING DEVICE COMPRISING A NOISE REDUCTION SYSTEM

This application is a Continuation of application Ser. No. 17/982,687, filed on Nov. 8, 2022, which is a Continuation of application Ser. No. 17/017,092, filed on Sep. 10, 2020 (now U.S. Pat. No. 11,533,554, issued Dec. 20, 2022), which claims priority under 35 U.S.C. § 119(a) to Application No. 19196675.3, filed in Europe on Sep. 11, 2019, all of which are hereby expressly incorporated by reference into the present application.

SUMMARY

Hearing devices may determine whether voice (or speech) is included in an audio signal, e.g. by applying a voice activity detector. However, voice often originate from wanted and unwanted sources at the same time thereby making it difficult to distinguish between the wanted and unwanted voice signals and to attenuate the unwanted voice signal. Accordingly, it is preferable to be able to attenuate voice from unwanted sources while enhancing voice from wanted sources.

The present application relates to hearing devices, e.g. hearing aids or headsets, in particular to noise reduction in hearing devices. The disclosure specifically relates to applications wherein a good (high quality) estimate of the voice of the user wearing the hearing device (or hearing devices) is needed, e.g. for transmission to another device, e.g. to a far-end communication partner or listener, and/or to a voice interface, e.g. for voice-control of the hearing device (or other devices or systems).

A Hearing Device

In an aspect of the present application, a hearing device is disclosed. The hearing device may be adapted for being located at or in an ear of a user, or for being fully or partially implanted in the head of a user.

The hearing device may comprise an input unit for providing at least one electric input signal representing sound in an environment of the user. Environment may refer to the free space surrounding the user stationary and/or dynamically depending on whether the user is standing still or moving around, and which contains audio (e.g. sound) that arrives at the location of the user. For example, an environment may refer to a closed room in which the user is located, or to the open space surrounding the user if the user is located outside e.g. a building.

The electric input signal may comprise a target speech signal from a target sound source and additional signal components, termed noise signal components, from one or more other sound sources. Target sound source may refer to one or more sound sources, such as one or more persons (e.g. the user of the hearing device and/or other persons) or electronic devices (e.g. tv, radio, etc.), which generate and/or emit speech signals, and which are wanted for the user to hear. One or more other sound sources may, for example, refer to one or more persons, electronic devices, or other (e.g. instruments, animals, etc.), which generates and/or emits additional signal components, termed noise signal components, and which are considered to be unwanted signal components for the user and, preferably, should be attenuated.

The hearing device may comprise a noise reduction system for providing an estimate of said target speech signal.

The noise signal components may be at least partially attenuated.

The hearing device may comprise an own voice detector for repeatedly estimating whether or not, or with what probability, said at least one electric input signal, or a signal derived therefrom, comprises speech originating from the voice of the user.

The hearing device may be further configured to provide that said noise signal components are identified during time segments.

The own voice detector may indicate that the at least one electric input signal, or a signal derived therefrom, originates from the voice of the user, or originates from the voice of the user with a probability above an own voice presence probability (OVPP) threshold value.

Thereby, noise signal components, which may also comprise voice from unwanted sound sources, may be detected during time intervals where the own voice detector estimates that the user is speaking, e.g. instead of or in addition to during time intervals of no voice activity (as is customary in the art). Thus, the noise signal components for being attenuated may be updated also while the user is speaking. For example, if a person is speaking during the same time segment as the user is speaking, sound from the person may be identified and labelled as noise, which should be attenuated.

Further, identifying noise signal components by use of own voice detection eliminates the need for additional detectors (e.g. a camera) dedicated to e.g. identify by image analysis whether a specific person is the source of unwanted noise, as he/she is speaking at the same time segment as the user.

Accordingly, an improved noise reduction may be allowed for.

The input unit may comprise a microphone. The input unit may comprise at least two microphones. The input unit may comprise three or more microphones.

Each microphone may provide an electric input signal. The electric input signal may comprise said target speech signal and said noise signal components.

The hearing device may comprise a voice activity detector for repeatedly estimating whether or not, or with what probability, said at least one electric input signal, or a signal derived therefrom, comprises speech.

Thereby, speech included in the at least one electric input signal may be enhanced.

The hearing device may comprise one or more beamformers. For example, the beamformer filter may comprise two or more beamformers.

The input unit may be configured to provide at least two electric input signals connected to the one or more beamformers. The one or more beamformers may be configured to provide at least one beamformed signal.

The one or more beamformers may comprise one or more own voice cancelling beamformers configured to attenuate signal components originating from the user's mouth, while signal components from (e.g. all) other directions are left unchanged or attenuated less.

The one or more beamformers may comprise one or more target beamformers for enhancing the voice of the target sound source (relative to sounds from other directions than a direction to the target sound source).

The target signal may be assumed to be the user's own voice.

The one or more beamformers may comprise an own voice beamformer configured to maintain signal components from the user's mouth while attenuating signal components from (e.g. all) other directions. The own voice beamformer may be determined in advance of operation of the hearing device (e.g. during a fitting procedure), and corresponding filter weights may e.g. be stored in a memory of the hearing device. Acoustic transfer functions from the user's mouth to each microphone of the hearing device (or devices) may e.g. be determined in advance of operation of the hearing device, either using a model (e.g. a head and torso model, e.g. HATS, Head and Torso Simulator 4128C from Brüel & Kjær Sound & Vibration Measurement A/S), or measuring on one or more persons, e.g. including the user. Absolute or relative acoustic transfer functions may be represented by a look vector $d=(d_1, \ldots, d_M)$, where each element represent a (absolute or relative) transfer function from the mouth to a specific one of the M microphones. One of the microphones may be defined as a reference microphone, and relative transfer functions may be defined from the reference microphone to the rest of the microphone of the hearing device (or hearing system). Own voice filter weights $W_{OV}$ may be determined in advance of or during operation of the hearing device. The own voice filter weights are a function of the look vector $d_{OV}(k)$, a noise covariance matrix estimate $\hat{C}_v(k,n)$ and an inter-microphone covariance matrix $C_x(k,n)$ for noisy microphone signals, where k and n are frequency and time indices, respectively. The calculation of the filter weights for a given type of beamformer (e.g. an MVDR beamformer) is customary in the art and e.g. exemplified in the detailed description of embodiments of the present disclosure.

The beamformer may comprise a minimum variance distortionless response (MVDR) beamformer.

The beamformer may comprise a multichannel Wiener filter (MWF) beamformer.

The beamformer may comprise a MVDR beamformer and a MWF beamformer.

The beamformer may comprise a MVDR filter followed by a single-channel post filter.

For example, the beamformer may comprise a MVDR beamformer and a single channel post Wiener filter.

An advantage of using an MVDR filter is that it does not distort target components.

An advantage of using an MWF filter is that it maximizes broadband signal-to-noise ratio (SNR).

The noise signal components may be represented by a noise covariance matrix estimate.

The noise covariance matrix may be based on cross power spectral densities (CPSDs) of the noise signal components.

Thereby, a compact (mathematically tractable) description of a noise field is provided.

The hearing device may comprise a beamformer filter comprising a number of beamformers.

The noise covariance matrix may be updated when said own voice detector indicates that the at least one electric input signal, or a signal derived therefrom, originates from the voice of the user.

The noise covariance matrix may be updated when said own voice detector indicates that the at least one electric input signal, or a signal derived therefrom, originates from the voice of the user with a probability above said OVPP-threshold value.

Thereby, voice from a (competing) speaker (unwanted speech) not being of (current) interest to the user and/or disturbing the speech of the user may be attenuated.

The noise signal components may additionally be identified during time segments wherein said voice activity detector indicates an absence of speech in the at least one electric input signal, or a signal derived therefrom.

The noise signal components may be identified during time segments wherein said voice activity detector indicates no speech, or a presence of speech with a probability below a speech presence probability (SPP) threshold value.

The hearing device may be configured to estimate said noise signal components using a Maximum Likelihood estimator.

Thereby, the noise covariance matrix estimate that best "explains" (has maximum likelihood) the observed microphone signals is provided.

The target speech signal from the target sound source may comprise (or constitute) an own voice speech signal from the hearing device user.

The target sound source may comprise (or constitute) an external speaker in the environment of the hearing device user.

The hearing device may comprise a voice interface for voice-control of the hearing device or other devices or systems.

The input to the voice interface may e.g. be based on an estimate of the user's own voice provided by an own voice beamformer configured to maintain signal components from the user's mouth while attenuating signal components from (e.g. all) other directions. The hearing device may comprise a wake-word detector based on the estimate of the user's voice. The hearing device may be configured to activate the voice interface on detection of a wake-word (e.g. with a probability above a wake-word detection threshold, e.g. larger than 60%).

The voice-interface may be incorporated in the part of the hearing device that is arranged at, behind or in the ear of the user. The hearing device may comprise one or more 'auxiliary devices', which communicate with the hearing device(s) and affect and/or benefit from the function of the hearing device(s). Auxiliary devices may be e.g. remote controls, audio gateway devices, mobile phones (e.g. smartphones), or music players. In such a case, the one or more auxiliary devices may comprise the voice-interface.

By providing a hearing device that comprises a voice interface, a seamless handling of the functioning of the hearing device is provided.

The hearing device may be constituted by or comprise a hearing aid, a headset, an active ear protection device or a combination thereof.

The hearing device may comprise a headset. The hearing device may comprise a hearing aid. The hearing device may e.g. comprise antenna and transceiver circuitry configured to establish a communication link to another device or system. The hearing device may e.g. be used to implement handsfree telephony.

The hearing device may further comprise a timer configured to determine a time segment of overlap between the own voice speech signal and a further speech signal.

A further speech signal may refer to a speech signal generated by a person, a radio, a tv, etc. configured to generate a speech signal.

The timer may be associated with the own voice detector. In case the target speech signal comprises speech from the hearing device user, the timer may be initiated when a further speech signal is detected at time segments where the own voice detector detects a speech signal from the user. The timer may be ended when the own voice detector does not detect a speech signal from the user. Accordingly, an unwanted speech signal may be identified and be attenuated.

The hearing device may be configured to determine whether said time segment exceeds a time limit, and if so to label the further speech signal as part of the noise signal component.

For example, the time limit may be at least ½ second, at least 1 second, at least 2 seconds.

The further speech signal may be speech from a competing speaker, and may as such be considered to be noise to the target speech signal. Accordingly, the further speech signal may be labelled as being part of the noise signal components so that the further speech signal may be attenuated.

The hearing device may be configured to label the further speech signal as being part of the noise signal components for a predetermined time segment. Hereafter, the further speech signal may be not labelled as being part of the noise signal components. For example, a voice signal from a person may be attenuated, when the person is not part of a conversation with the hearing device user, but may be not attenuated at a later time, when the person is engaging a conversation with the hearing device user.

The noise reduction system may be updated recursively. The noise signal components may be identified recursively. Accordingly, a recursive update of the noise covariance matrix may be provided. For example, a voice signal from a sound source, which at one time has been identified and labelled as being part of the noise signal components, may with time be attenuated with a continuously decreasing degree. At some time, the sound source may be exempted from being attenuated unless the sound source is once again identified and labelled as being part of the noise signal components.

The hearing device may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing device may comprise a signal processor for enhancing the input signals and providing a processed output signal.

The hearing device may comprise an output unit for providing a stimulus perceived by the user as an acoustic signal based on a processed electric signal. The output unit may comprise a number of electrodes of a cochlear implant (for a CI type hearing device) or a vibrator of a bone conducting hearing device. The output unit may comprise an output transducer. The output transducer may comprise a receiver (loudspeaker) for providing the stimulus as an acoustic signal to the user (e.g. in an acoustic (air conduction based) hearing device). The output transducer may comprise a vibrator for providing the stimulus as mechanical vibration of a skull bone to the user (e.g. in a bone-attached or bone-anchored hearing device). The output unit may comprise a wireless transmitter for transmitting wireless signals comprising or representing sound to another device.

The hearing device comprises an input unit for providing one or more electric input signals representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound.

The wireless receiver and/or transmitter (e.g. a transceiver) may e.g. be configured to receive and/or transmit an electromagnetic signal in the radio frequency range (3 kHz to 300 GHz). The wireless receiver and/or transmitter may e.g. be configured to receive and/or transmit an electromagnetic signal in a frequency range of light (e.g. infrared light 300 GHz to 430 THz, or visible light, e.g. 430 THz to 770 THz).

The hearing device may comprise antenna and transceiver circuitry (e.g. a wireless receiver) for wirelessly receiving and/or transmitting a signal from/to another device, e.g. from/to an entertainment device (e.g. a TV-set), a communication device (e.g. a smartphone), a wireless microphone, a. PC, or another hearing device. The signal may represent or comprise an audio signal and/or a control signal and/or an information signal. The hearing device may comprise appropriate modulation/demodulation circuitry for modulating/demodulating, the transmitted/received signal. The signal may represent an audio signal and/or a control signal e.g. for setting an operational parameter (e.g. volume) and/or a processing parameter of the hearing device and/or a voice control command, etc. In general, a wireless link established by antenna and transceiver circuitry of the hearing device can be of any type. The wireless link may be established between two devices, e.g. between an entertainment device (e.g. a TV) or a communication device (e.g. a smartphone) and the hearing device, or between two hearing devices, e.g. via a third, intermediate device (e.g. a processing device, such as a remote control device, a smartphone, etc.). The wireless link may be a link based on near-field communication, e.g. an inductive link based on an inductive coupling between antenna coils of transmitter and receiver parts. The wireless link may be based on far-field, electromagnetic radiation. The communication via the wireless link may be arranged according to a specific modulation scheme, e.g. an analogue modulation scheme, such as FM (frequency modulation) or AM (amplitude modulation) or PM (phase modulation), or a digital modulation scheme, such as ASK (amplitude shift keying), e.g. On-Off keying, FSK (frequency shift keying), PSK (phase shift keying), e.g. MSK (minimum shift keying), or QAM (quadrature amplitude modulation), etc.

The communication between the hearing device and the other device may be in the base band (audio frequency range, e.g. between 0 and 20 kHz). Communication between the hearing device and the other device may be based on some sort of modulation at frequencies above 100 kHz. Preferably, frequencies used to establish a communication link between the hearing device and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology).

The hearing device may have a maximum outer dimension of the order of 0.08 m (e.g. a head set). The hearing device may have a maximum outer dimension of the order of 0.04 m (e.g. a hearing instrument).

The hearing device may comprise a directional microphone system adapted to spatially filter sounds from the environment, and thereby enhance a target acoustic source among a multitude of acoustic sources in the local environment of the user wearing the hearing device. The directional system may be adapted to detect (such as adaptively detect) from which direction a particular part of the microphone signal originates. This can be achieved in various different ways as e.g. described in the prior art. In hearing devices, a microphone array beamformer is often used for spatially attenuating background noise sources. Many beamformer variants can be found in literature. The minimum variance distortionless response (MVDR) beamformer is widely used in microphone array signal processing. Ideally, the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing device may be or form part of a portable (i.e. configured to be wearable) device, e.g. a device comprising a local energy source, e.g. a battery, e.g. a rechargeable battery. The hearing device may e.g. be a low weight, easily wearable, device, e.g. having a total weight less than 100 g, e.g. less than 20 g, e.g. less than 10 g.

The hearing device may comprise a forward or signal path between an input unit e.g. an input transducer, such as a microphone or a microphone system and/or direct electric input (e.g. a wireless receiver)) and an output unit, e.g. an output transducer. The signal processor may be located in the forward path. The signal processor may be adapted to provide a frequency dependent gain according to a user's particular needs. The hearing device may comprise an analysis path comprising functional components for analyzing the input signal (e.g. determining a level, a modulation, a type of signal, an acoustic feedback estimate, etc.). Some or all signal processing of the analysis path and/or the signal path may be conducted in the frequency domain. Some or all signal processing of the analysis path and/or the signal path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 μs, for $f_s$=20 kHz. A number of audio samples may be arranged in a time frame. A time frame may comprise 64 or 128 audio data samples. Other frame lengths may be used depending on the practical application.

The hearing device may comprise an analogue-to-digital (AD) converter to digitize an analogue input (e.g. from an input transducer, such as a microphone) with a predefined sampling rate, e.g. 20 kHz. The hearing devices may comprise a digital-to-analogue (DA) converter to convert a digital signal to an analogue output signal, e.g. for being presented to a user via an output transducer.

The hearing device, e.g. the input unit, and/or the antenna and transceiver circuitry may comprise a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit for converting a time variant input signal to a (time variant) signal in the (time-)frequency domain. The frequency range considered by the hearing device from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing device may be split into a number NI of frequency bands (e.g. of uniform width), where NI is e.g. larger than 5, such as larger than 10, such as larger than 50, such as larger than 100, such as larger than 500, at least some of which are processed individually. The hearing device may be adapted to process a signal of the forward and/or analysis path in a number NP of different frequency channels (NP≤NI). The frequency channels may be uniform or non-uniform in width (e.g. increasing in width with frequency), overlapping or non-overt zipping.

The hearing device may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing device is reduced (e.g. to save power), e.g. to disable wireless communication, and/or to disable specific features of the hearing device. A mode of operation may be a voice control mode, where a voice interface is activated, e.g. via a specific wake-word (or words), e.g. 'Hey Oticon'. A mode of operation may be a communication mode, where the hearing device is configured to pick up the user's voice and transmit it to another device (and possibly to receive audio from another device, e.g. to enable handsfree telephony).

The hearing device may comprise a number of detectors configured to provide status signals relating to a current physical environment of the hearing device (e.g. the current acoustic environment), and/or to a current state of the user wearing the hearing device, and/or to a current state or mode of operation of the hearing device. Alternatively or additionally, one or more detectors may form part of an external device in communication (e.g. wirelessly) with the hearing device. An external device may e.g. comprise another hearing device, a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain), e.g. in a limited number of frequency bands.

The number of detectors may comprise a level detector for estimating a current level of a signal of the forward path. The predefined criterion comprises whether the current level of a signal of the forward path is above or below a given (L-)threshold value. The level detector may operate on the full band signal (time domain). The level detector may operate on band split signals ((time-) frequency domain).

The hearing device may comprise a voice detector (VD) for estimating whether or not (or with what probability) an input signal comprises a voice signal (at a given point in time). A voice signal is in the present context taken to include a speech signal from a human being. It may also include other forms of utterances generated by the human speech system (e.g. singing). The voice detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice detector may be adapted to detect as a VOICE also the user's own voice. Alternatively, the voice detector is adapted to exclude a user's own voice from the detection of a VOICE.

The hearing device may comprise an own voice detector for estimating whether or not (or with what probability) a given input sound (e.g. a voice, e.g. speech) originates from the voice of the user of the system. A microphone system of the hearing device may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing device may comprise a classification unit configured to classify the current situation based on input signals from (at least some of) the detectors, and possibly other inputs as well. In the present context 'a current situation' is taken to be defined by one or more of a) the physical environment e.g. including the current electromagnetic environment, e.g. the occurrence of electromagnetic signals (e.g. comprising audio and/or control signals) intended or not intended for reception by the hearing device, or other properties of the current environment than acoustic);
b) the current acoustic situation (input level, feedback, etc.), and
c) the current mode or state of the user (movement, temperature, cognitive load, etc.);
d) the current mode or state of the hearing device (program selected, time elapsed since last user interaction, etc.) and/or of another device in communication with the hearing device.

The classification unit may be based on or comprise a neural network, e.g. a trained neural network.

The hearing device may further comprise other relevant functionality for the application in question, e.g. compression, feedback control, etc.

The hearing device may comprise a listening device, e.g. a hearing aid, e.g. a hearing instrument, e.g. a hearing instrument adapted for being located at the ear or fully or partially in the ear canal of a user, e.g. a headset, an earphone, an ear protection device or a combination thereof. A hearing system may comprise a speakerphone (comprising a number of input transducers and a number of output transducers, e.g. for use in an audio conference situation), e.g. comprising a beamformer filtering unit, e.g. providing multiple beamforming capabilities.

In an aspect of the present application, a binaural hearing system comprising a first hearing device and an auxiliary device is disclosed. The binaural hearing system may be configured to allow an exchange of data between the first hearing devices and the auxiliary device.

In an aspect of the present application, a binaural hearing system comprising a first and a second hearing device is disclosed. The binaural hearing system may be configured to allow an exchange of data between the first and the second hearing devices, e.g. via an intermediate auxiliary device.

Use

In an aspect, use of a hearing device as described above, in the 'detailed description of embodiments' and in the claims, is moreover provided. Use may be provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Method

In an aspect, a method of operating a hearing device is provided.

The hearing device may be adapted for being located at or in an ear of a user, or for being fully or partially implanted in the head of a user.

The method may comprise providing at least one electric input signal representing sound in an environment of the user.

The electric input signal may comprise a target speech signal from a target sound source and additional signal components, termed noise signal components, from one or more other sound sources.

The method may comprise providing an estimate of said target speech signal.

The noise signal components may be at least partially attenuated.

The method may comprise repeatedly estimating whether or not, or with what probability, said at least one electric input signal, or a signal derived therefrom, comprises speech originating from the voice of the user.

The method may further comprise identifying said noise signal components during time segments.

The own voice detector may indicate that the at least one electric input signal, or a signal derived therefrom, originates from the voice of the user, or originates from the voice of the user with a probability above an own voice presence probability (OVPP) threshold value.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

A Computer Readable Medium or Data Carrier

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

The method step of providing an estimate of said target speech signal, wherein said noise signal components are at least partially attenuated may be implemented in software.

The method step of repeatedly estimating whether or not, or with what probability, said at least one electric input signal, or a signal derived therefrom, comprises speech originating from the voice of the user may be implemented in software.

The method step of identifying said noise signal components during time segments wherein said own voice detector indicates that the at least one electric input signal, or a signal derived therefrom, originates from the voice of the user, or originates from the voice of the user with a probability above an own voice presence probability (OVPP) threshold value may be implemented in software.

A Computer Program

A computer program (product) comprising instructions which, when the program is executed by a computer, cause the computer to carry out (steps of) the method described above, in the 'detailed description of embodiments' and in the claims is furthermore provided by the present application.

A Data Processing System

In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System

In a further aspect, a hearing system comprising a hearing device as described above, in the 'detailed description of embodiments', and in the claims, AND an auxiliary device is moreover provided.

The hearing system may be adapted to establish a communication link between the hearing device and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may constitute or comprise a remote control for controlling functionality and operation of the hearing device(s). The function of a remote control may be implemented in a smartphone, the smartphone possibly running an APP allowing to control the functionality of the audio processing device via the smartphone (the hearing device(s) comprising an appropriate wireless interface to the smartphone, e.g. based on Bluetooth or some other standardized or proprietary scheme).

The auxiliary device may be or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing device.

The auxiliary device may be constituted by or comprise another hearing device. The hearing system may comprise two hearing devices adapted to implement a binaural hearing system, e.g. a binaural hearing aid system.

An APP

In a further aspect, a non-transitory application, termed an APP, is furthermore provided by the present disclosure. The APP comprises executable instructions configured to be executed on an auxiliary device to implement a user interface for a hearing device or a hearing system described above in the 'detailed description of embodiments', and in the claims. The APP may be configured to run on a cellular phone, e.g. a smartphone, or on another portable device allowing communication with said hearing device or said hearing system.

Definitions

In the present context, a 'hearing device' refers to a device, such as a hearing aid, e.g. a hearing instrument, or an active ear-protection device, or other audio processing device, which is adapted to improve, augment and/or protect the heating capability of a user by receiving acoustic signals from the user's surroundings, generating corresponding audio signals, possibly modifying the audio signals and providing the possibly modified audio signals as audible signals to at least one of the user's ears. A 'hearing device' further refers to a device such as an earphone or a headset adapted to receive audio signals electronically, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing device may be configured to be worn in any known way, e.g. as a unit arranged behind the ear with a tube leading radiated acoustic signals into the ear canal or with an output transducer, e.g. a loudspeaker, arranged close to or in the ear canal, as a unit entirely or partly arranged in the pinna and/or in the ear canal, as a unit, e.g. a vibrator, attached to a fixture implanted into the skull bone, as an attachable, or entirely or partly implanted, unit, etc. The hearing device may comprise a single unit or several units communicating electronically with each other. The loudspeaker may be arranged in a housing together with other components of the hearing device, or may be an external unit in itself (possibly in combination with a flexible guiding element, e.g. a dome-like element). The hearing device may be implemented in one single unit (housing) or in a number of units individually connected to each other.

More generally, a hearing device comprises an input transducer for receiving an acoustic signal from a user's surroundings and providing a corresponding input audio signal and/or a receiver for electronically (i.e. wired or wirelessly) receiving an input audio signal, a (typically configurable) signal processing circuit (e.g. a signal processor, e.g. comprising a configurable (programmable) processor, e.g. a digital signal processor) for processing the input audio signal and an output unit for providing an audible signal to the user in dependence on the processed audio signal. The signal processor may be adapted to process the input signal in the time domain or in a number of frequency bands. In some hearing devices, an amplifier and/or compressor may constitute the signal processing circuit. The signal processing circuit typically comprises one or more (integrated or separate) memory elements for executing programs and/or for storing parameters used (or potentially used) in the processing and/or for storing information relevant for the function of the hearing device and/or for storing information (e.g. processed information, e.g. provided by the signal processing circuit), e.g. for use in connection with an interface to a user and/or an interface to a programming device. In some hearing devices, the output unit may comprise an output transducer, such as e.g. a loudspeaker for providing an air-borne acoustic signal or a vibrator for providing a structure-borne or liquid-borne acoustic signal. In some hearing devices, the output unit may comprise one or more output electrodes for providing electric signals (e.g. a multi-electrode array for electrically stimulating the cochlear nerve). The hearing device may comprise a speakerphone (comprising a number of input transducers and a number of output transducers, e.g. for use in an audio conference situation).

In some hearing devices, the vibrator may be adapted to provide a structure-borne acoustic signal transcutaneously or percutaneously to the skull bone. In some hearing devices, the vibrator may be implanted in the middle ear and/or in the inner ear. In some hearing devices, the vibrator may be adapted to provide a structure-borne acoustic signal to a middle-ear bone and/or to the cochlea. In some hearing devices, the vibrator may be adapted to provide a liquid-borne acoustic signal to the cochlear liquid, e.g. through the oval window. In some hearing devices, the output electrodes may be implanted in the cochlea or on the inside of the skull bone and may be adapted to provide the electric signals to the hair cells of the cochlea, to one or more hearing nerves, to the auditory brainstem, to the auditory midbrain, to the auditory cortex and/or to other parts of the cerebral cortex.

A hearing device, e.g. a hearing aid, may be adapted to a particular user's needs, e.g. a hearing impairment. A configurable signal processing circuit of the hearing device may be adapted to apply a frequency and level dependent compressive amplification of an input signal. A customized frequency and level dependent gain (amplification or compression) may be determined in a fitting process by a fitting system based on a user's hearing data, e.g. an audiogram, using a fitting rationale (e.g. adapted to speech). The frequency and level dependent gain may e.g. be embodied in processing parameters, e.g. uploaded to the hearing device via an interface to a programming device (fitting system), and used by a processing algorithm executed by the configurable signal processing circuit of the heating device.

A 'hearing system' refers to a system comprising one or two hearing devices, and a 'binaural hearing system' refers to a system comprising two hearing devices and being adapted to cooperatively provide audible signals to both of the user's ears. Hearing systems or binaural hearing systems may further comprise one or more 'auxiliary devices', which communicate with the hearing device(s) and affect and/or benefit from the function of the hearing device(s). Auxiliary devices may be e.g. remote controls, audio gateway devices, mobile phones (e.g. smartphones), or music players. Hearing devices, hearing systems or binaural hearing systems may e.g. be used for compensating for a healing-impaired person's loss of hearing capability, augmenting or protecting a normal-hearing person's hearing capability and/or conveying electronic audio signals to a person. Hearing devices or hearing systems may e.g. form part of or interact with public-address systems, active ear protection systems, handsfree telephone systems, car audio systems, entertainment (e.g. karaoke) systems, teleconferencing systems, classroom amplification systems, etc.

Embodiments of the disclosure may e.g. be useful in applications wherein a good (high quality) estimate of the voice of the user wearing the hearing device (or hearing devices) is needed.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Figure 1A:
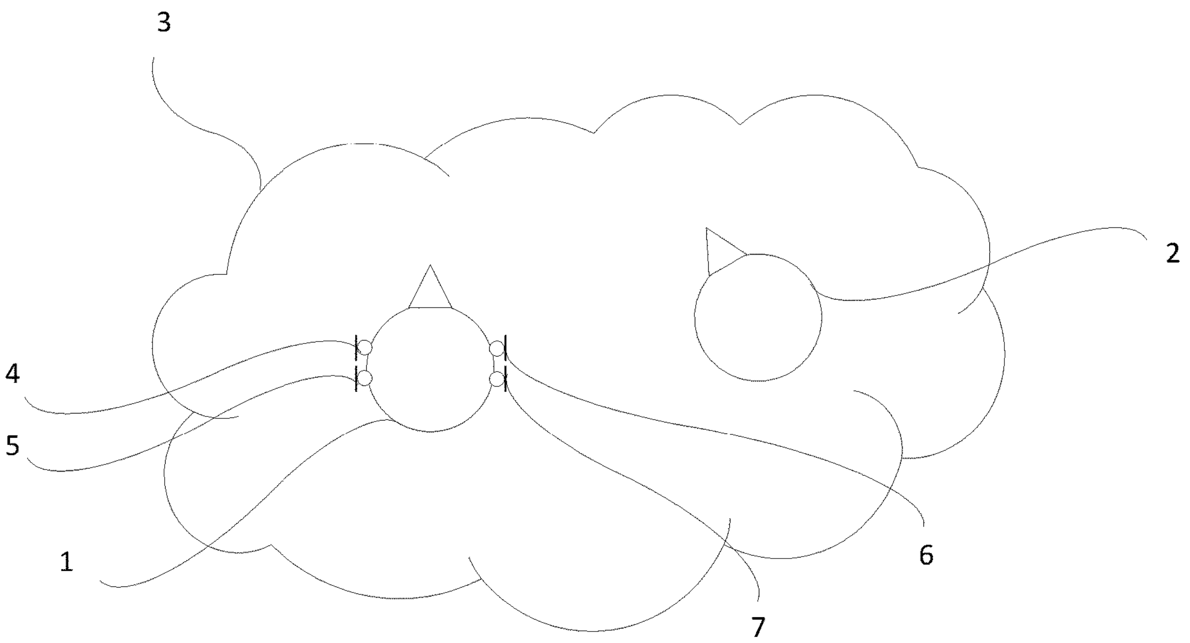
FIG. 1A shows an exemplary application scenario of a hearing device system according to the present disclosure.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (PSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing devices, e.g. hearing aids.

Speech enhancement and noise reduction are often needed in real-world audio applications where noise from the acoustic environment masks a desired speech signal often resulting in reduced speech intelligibility, Examples of audio applications where noise reduction can be beneficial are hands-free wireless communication devices e.g. headsets, automatic speech recognition systems, and hearing aids (HA). In particular, applications such as headset communication devices where a ('far end') human listener needs to understand the noisy own voice picked-up by the headset microphones, noise can greatly reduce sound quality and speech intelligibility making conversations more difficult.

'Headset applications' may in the present context include normal headset applications for use in communication with a 'far end speaker' e.g. via a network (such as office or call-centre applications) but also hearing aid applications where the hearing aid is in a specific 'communication or telephone mode' adapted to pick up a user's voice and transmit it to another device (e.g. a far-end-communication partner), while possibly receiving audio from the other device (e.g. from the far-end-communication partner).

Noise reduction algorithms implemented in multi microphone devices may comprise a set of linear filters, e.g. spatial filters and temporal filters that are used to shape the sound picked-up by the microphones. Spatial filters are able to alter the sound by enhancing or attenuating sound as a function of direction, while temporal filters alter the frequency response of the noisy signal to enhance or attenuate specific frequencies. To find the optimal filter coefficients, it is usually necessary to know the noise characteristics of the acoustic environment. Unfortunately, these noise characteristics are often unknown and need to be estimated online. Characteristics that are often necessary as inputs to multichannel noise reduction algorithms are e.g. the cross power spectral densities (CPSDs) of the noise. The noise CPSDs are for example needed for the minimum variance distortionless response (MVDR) and multichannel Wiener filter (MWF) beamformers which are common beamformers implemented in multi-microphone noise reduction systems.

To estimate the noise statistics, researchers have developed a wide variety of estimators of the noise statistics e.g. [1-5]. In [1,4] they propose a maximum likelihood (ML) estimator of the noise CPSD matrix during speech presence by assuming that the noise CPSD matrix remains identical up to a scalar multiplier. This estimator performs well, when the underlying structure of the noise CPSD matrix does not change over time, e.g. for car cabin noise and isotropic noise fields, but may fail otherwise. In many realistic acoustic environments, the underlying structure of the noise CPSD matrix cannot be assumed fixed, for example when a prominent non-stationary interference noise source is present in the acoustic scene. In particular, when the interference is a competing speaker, then many noise reduction systems fail at efficiently suppressing the competing speaker as it is harder to determine whether the own voice or the competing speaker is the desired speech.

In FIG. 1A, the environment of the hearing device user 1 is shown. The environment is shown to comprise the hearing device user 1, a target sound source 2, and noise signal components 3.

The hearing device user 1 may wear a hearing device comprising a first microphone 4 and a second microphone 5 on a left ear of the user 1, and a third microphone 6 and a fourth microphone 7 on the right ear of the user 1.

The target sound source 2 may be located near the hearing device user 1 and may be configured to generate and emit a target speech signal into the environment of the user 1. The target source 2 may as such be a person, a radio, a television, etc. configured to generate a target speech signal. The target speech signal may be directed towards the user 1 or may be directed away from the user 1.

The noise signal components 3 are shown to surround both the hearing device user 1 and the target sound source 2 and therefore effect the target source signal received at the hearing device user 1. The noise signal components may comprise localized noise sources (e.g. a machine, a fan, etc.), and/or distributed (diffuse, isotropic) noise sound sources.

The first microphone 4, the second microphone 5, the third microphone 6 and the fourth microphone 7 may (each) provide an electric input signal comprising the target speech signal and the noise signal components 3.

Figure 1B:
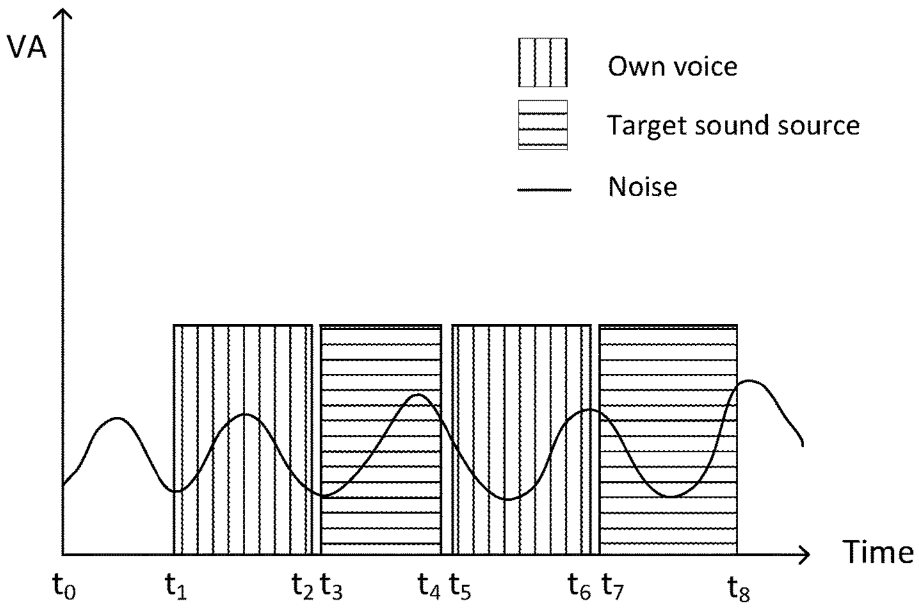
FIGS. 1B to 1D show the corresponding voice activity, voice activity detector (VAD), and noise update, respectively, for identical time segments according the present disclosure.

In FIG. 1B, the voice activity (VA) is illustrated as a function of a time segment. It is assumed that the target source 2 and the user 1 are speaking back-to-back, i.e. with no or only minimal pause in between speech, e.g. of a conversation. The user 1 is illustrated to speak in the time segment between t1 and t2, and between t5 and t6 (denoted 'own voice'), whereas the target source 2 is illustrated to speak in the time segment between t3 and t4, and between t7 and t8 (denoted 'target sound source'). Inuring the entire time segment of FIG. 1B, there is a noise signal with a randomly fluctuating noise level (solid curve denoted 'Noise').

Figure 1C:
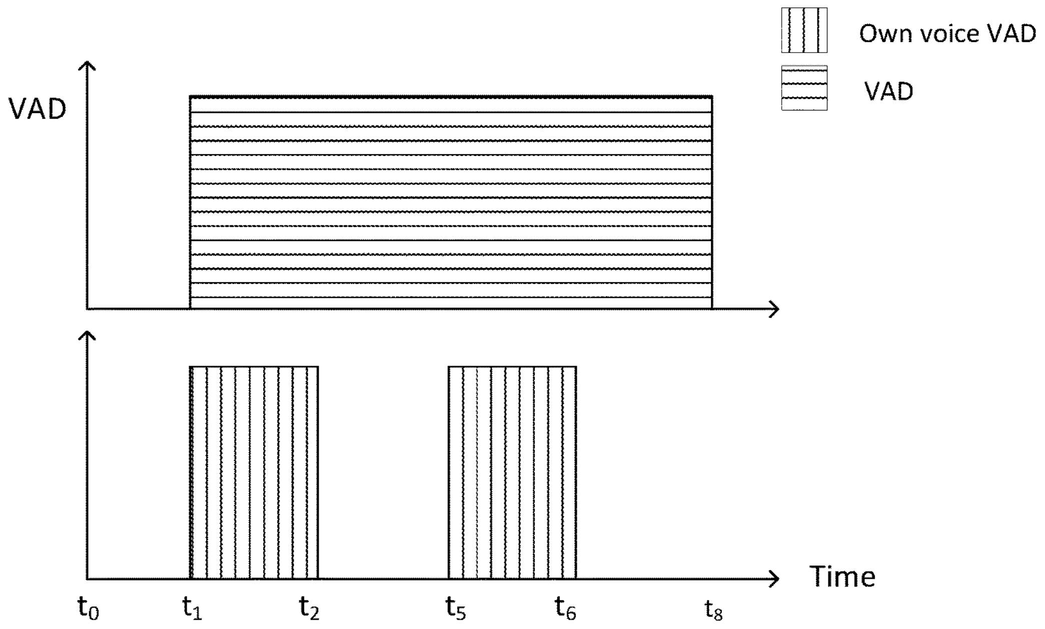

FIG. 1C illustrates how the exemplary voice activity of FIG. 1B may be detected with use of an own-voice VAD (e.g. own voice detector (OVD)) and with a VAD (i.e. a classical VAD).

The own voice VAD may detect that the user 1 is speaking in the time segment between t1 and t2 and in the time segment between t5 and t6. The VAD on the other hand will detect that speech (from both the user 1 and the target source 2) is being generated in the entire time segment from t1 to t8. However, depending on the resolution of the VAD used there may be a small break in detected voice activity in the segments t2 to t3, t4 to t5, and t0 to t7.

Figure 1D:
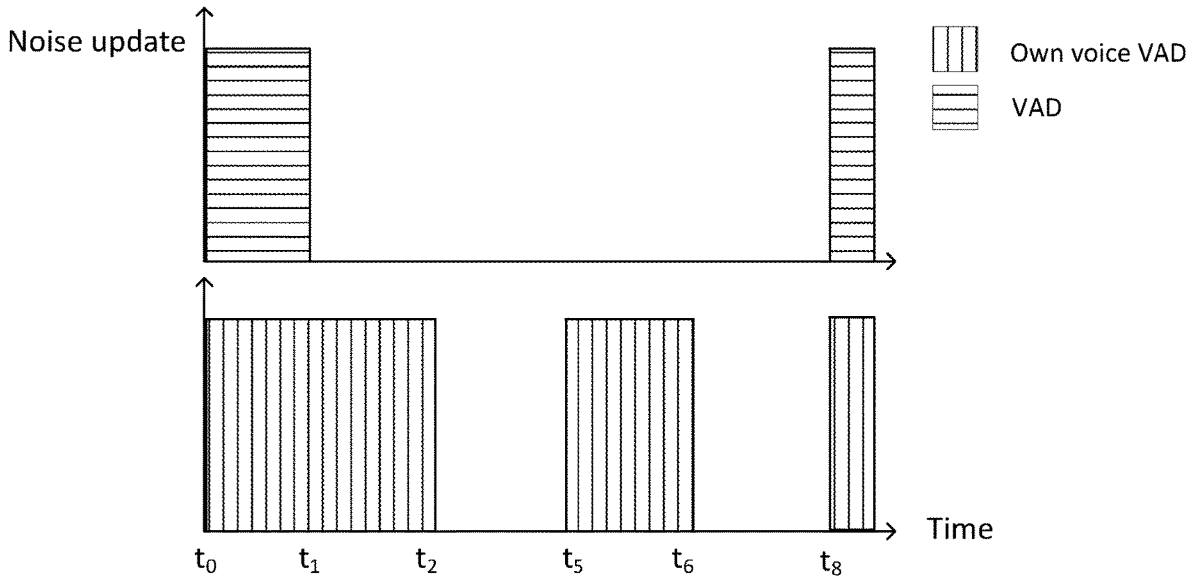

FIG. 1D illustrates when the hearing device may be able to update a noise reduction system for providing an estimate of said target speech signal and at least partially attenuating the noise signal components 3.

In a classical approach (upper part of FIG. 1D) in which the VAD may be used to detect the presence of speech, the noise reduction system of the heating device will only be updated at times where no speech is generated (both from the user 1 and from the target source 2), as VAD is not able to distinguish between speech from the user 1 and from the target source 2. Accordingly, only at times where the VAD does not detect speech, i.e. from t0 to t1 and from t8 ongoing, the noise reduction system will be updated.

With use of an own voice VAD (lower part of FIG. 1D), the noise reduction system of the hearing device may be updated not only when no speech is detected, but also when speech from the user 1 is detected with the own voice VAD, i.e. from t0 to t2, from t5 to t6, and from t8 ongoing.

Accordingly, noise signal components may be identified during time segments (time intervals) where said own voice detector indicates that the at least one electric input signal, or a signal derived therefrom, originates from the voice of the user 1, or originates from the voice of the user 1 with a probability above an own voice presence probability (OVPP) threshold value, e.g. 60%, or 70%.

Combining the own voice VAD and the VAD in the hearing device, the noise reduction system may be configured to both detect when the user 1 is speaking and when the target source 2 is speaking. Thereby, the noise reduction system may be updated during time segments where no speech signal is generated and where the user 1 is speaking, but may be prevented from updating at time segments where only the target sound source 2 is generating a target speech signal (speaking).

Figure 2A:
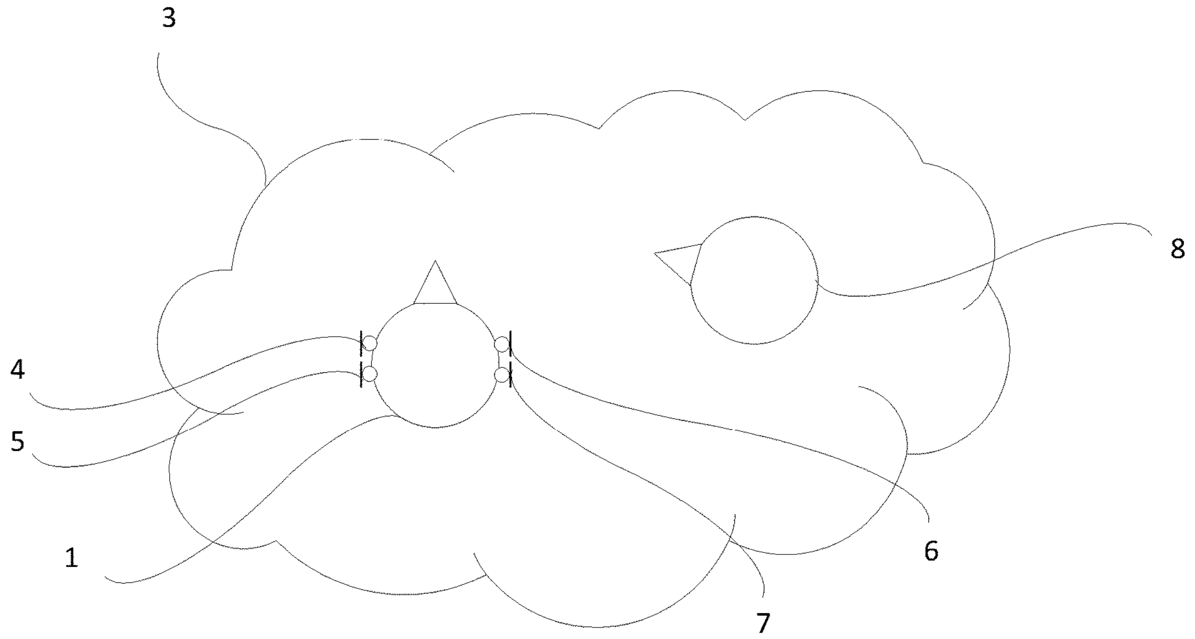
FIG. 2A shows an exemplary application scenario of a hearing device system according to the present disclosure.

In FIG. 2A, the environment of the hearing device user 1 is shown. The environment is shown to comprise the hearing device user 1, a competing speaker 8, and noise signal components 3.

As was the case in FIG. 1A, the hearing device user 1 may wear a hearing device comprising a first microphone 4 and a second microphone 5 at or on a left ear of the user 1, and a third microphone 6 and a fourth microphone 7 at or on the right ear of the user 1.

The competing speaker 8 may be located near the hearing device user 1 and may be configured to generate and emit a competing speech signal (i.e. an unwanted speech signal) into the environment of the user 1. The competing speaker 8 may as such be a person, a radio, a television, etc. configured to generate a competing speech signal. The competing speech signal may be directed towards the user 1 or may be directed away from the user 1.

The noise signal components 3 are shown to surround both the hearing device user 1 and the competing speaker 8 and therefore effect the estimation of the own voice of the user 1, i.e. the wanted speech signal (e.g. in case the hearing device comprises or implements a headset), received at the hearing device microphones 4,5,6,7.

Figure 2B:
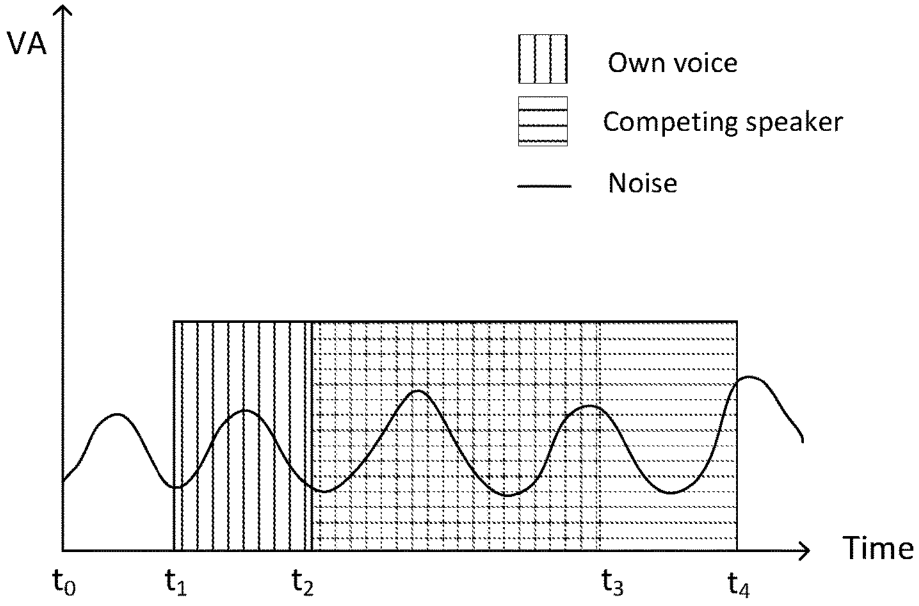
FIGS. 2B to 2D show the corresponding voice activity, voice activity detector (VAD), and noise update, respectively, for identical time segments according the present disclosure.

In FIG. 2B, the voice activity (VA) is illustrated as a function of a time segment (Time). It is assumed that the user 1 is speaking from t1 to t3 and that the competing speaker 8 is speaking from t2 to t4, whereby the voice of the competing speaker 8 is overlapping the voice of the user 1. During the entire time segment of FIG. 2B, there is a noise signal with a randomly fluctuating noise level.

Figure 2C:
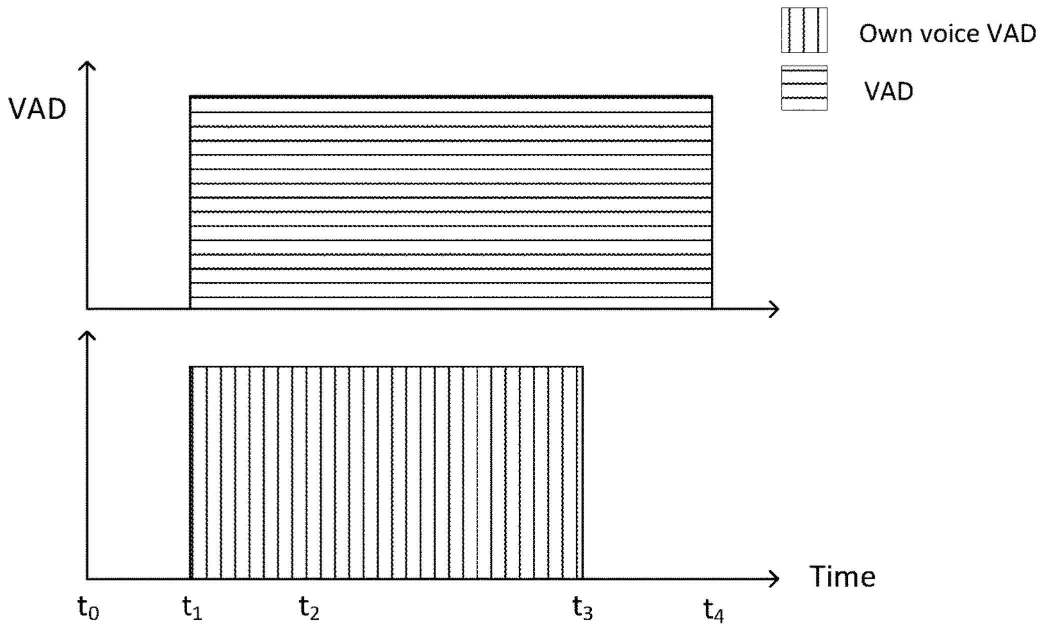

FIG. 2C illustrates how the exemplary voice activity of FIG. 2B may be detected with use of an own-voice VAD and with a (general) VAD.

The own voice VAD (lower part of FIG. 2C) may detect that the user 1 is speaking in the time segment between t1 and 3. The VAD (upper part of FIG. 2C) on the other hand will detect that speech (from both the user 1 and the competing speaker 8) is being generated in the entire time segment from t1 to t4.

Figure 2D:
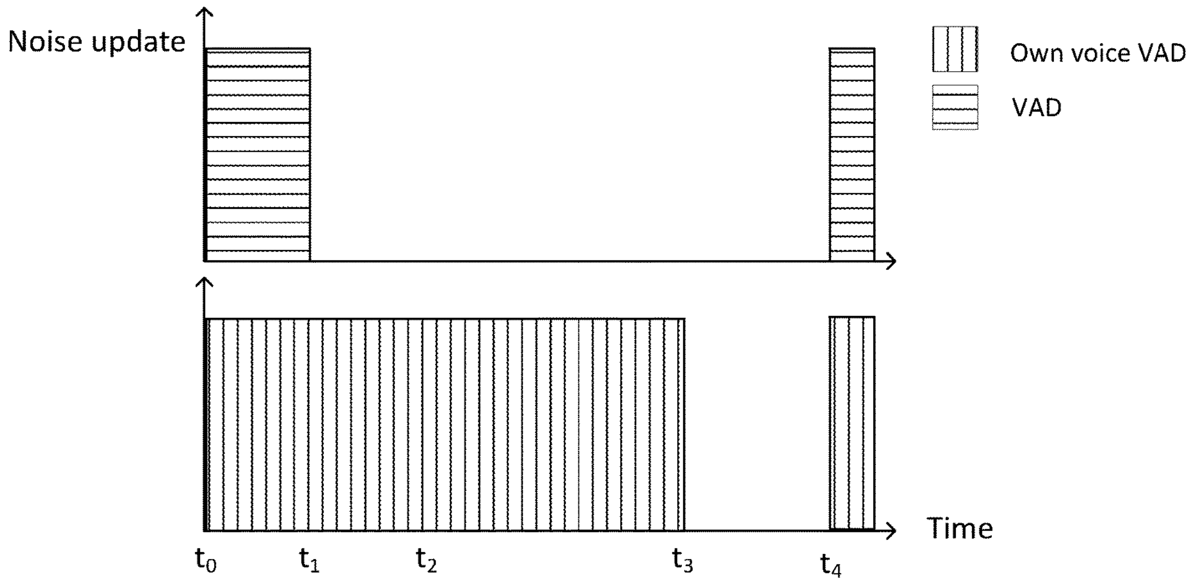

FIG. 2D illustrates when the hearing device may be able to update a noise reduction system for providing an estimate of said target speech signal and at least partially attenuating the noise signal components 3.

In a classical approach (upper part of FIG. 2D) in which the VAD would be used to detect the presence of speech, the noise reduction system of the hearing device would only be updated at times where no speech is generated (both from the user 1 and from the competing speaker 8), as the general VAD is not able to distinguish between speech from the user 1 and from the competing speaker 8. Accordingly, only at times where the VAD does not detect speech, i.e. from t0 to t1 (and from t4 and on), the noise reduction system may be updated.

With use of an own voice VAD (lower part of FIG. 2D), the noise reduction system of the hearing device may be configured to be updated not only when no speech is detected, i.e. from t0 to t1 (and from t4 and on), but also when speech from the user 1 is detected with the own voice VAD, i.e. (in total) from t0 to t3.

Accordingly, noise signal components (including from the competing speaker 8) may be identified during time segments where said own voice detector indicates that the at least one electric input signal, or a signal derived therefrom, originates from the voice of the user 1, or originates from the voice of the user 1 with a probability above an own voice presence probability (OVPP) threshold value.

Combining the own voice VAD and the VAD in the hearing device, the noise reduction system may be configured to both detect when the user 1 is speaking and when the competing speaker 8 is speaking alone. Thereby, the noise reduction system may be updated during time intervals where no speech signal is generated and where the user 1 is speaking, but may be prevented from updating at time intervals where the competing speaker 8 is generating a speech signal.

Figure 3A:
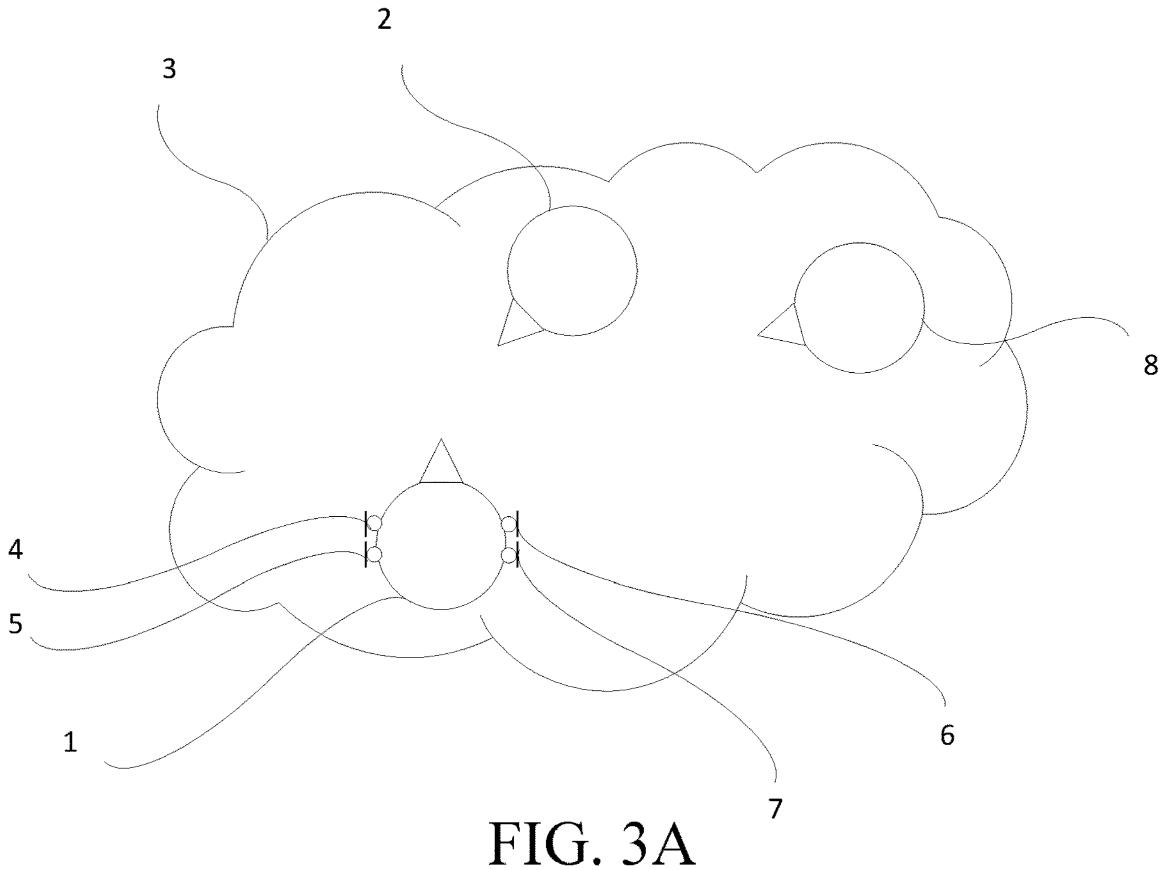
FIG. 3A shows an exemplary application scenario of a hearing device system according to the present disclosure.

In FIG. 3A, the environment of the hearing device user 1 is shown. The environment is shown to comprise the hearing device user 1, a target sound source 2, a competing speaker 8, and noise signal components 3.

As was the case in FIGS. 1A and 2A, the hearing device user 1 may wear a hearing device comprising a first microphone 4 and a second microphone 5 on a left ear of the user 1, and a third microphone 6 and a fourth microphone 7 on the right ear of the user 1.

The target sound source 2 and the competing speaker 8 may be located near the hearing device user 1 and may be configured to generate and emit a speech signals into the environment of the user 1. The target speech signal and/or the competing speaker speech signal may be directed towards the user 1 or may be directed away from the user 1.

The noise signal components 3 are shown to surround both the hearing device user 1, the competing speaker 8, and the target sound source 2 and may therefore affect the target source signal received at the hearing device user 1.

The first microphone 4, the second microphone 5, the third microphone 6 and the fourth microphone 7 may provide an electric input signal comprising the target speech signal, the competing speaker signal, and the noise signal components 3.

Figure 3B:
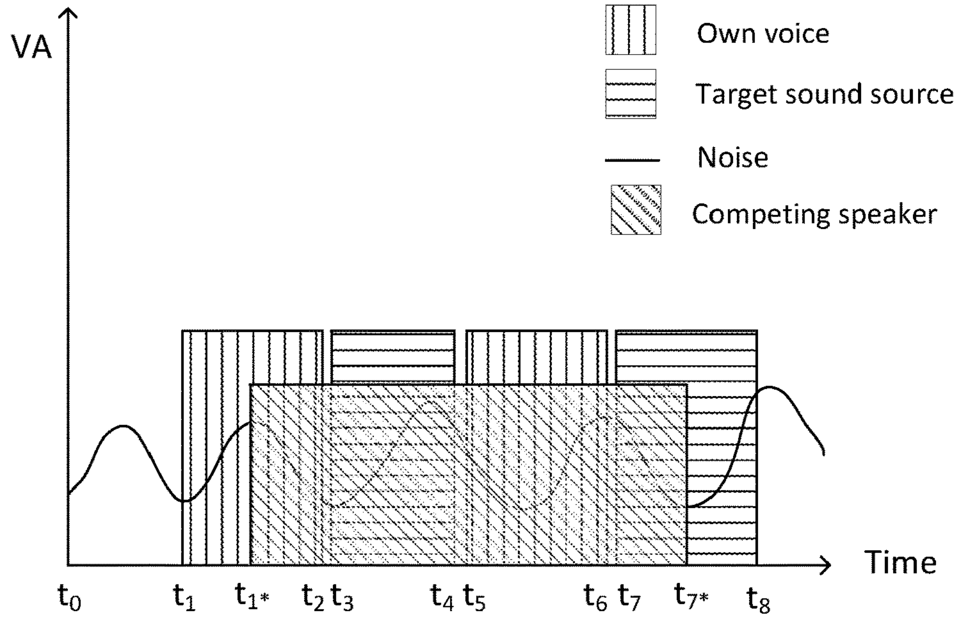
FIGS. 3B to 3D show the corresponding voice activity, voice activity detector (VAD), and noise update, respectively, for identical time segments according the present disclosure.

In FIG. 3B, the voice activity (VA) is illustrated as a function of a time interval (Time). It is assumed that the target source 2 and the user 1 are speaking back-to-back and that the competing speaker 8 is overlapping the speech of the target source 2 and the user 1. The user 1 is illustrated to speak in the time interval between t1 and t2, and between t5 and t6 (Own voice), whereas the target source 2 is illustrated to speak in the time interval between t3 and t4, and between t7 and t8 (Target sound source). The competing speaker 8 is illustrated to speak in the time interval between t1* and t7* (Competing speaker). During the entire time interval of FIG. 3B, there is a noise signal with a randomly fluctuating noise level (solid graph denoted 'noise').

Figure 3C:
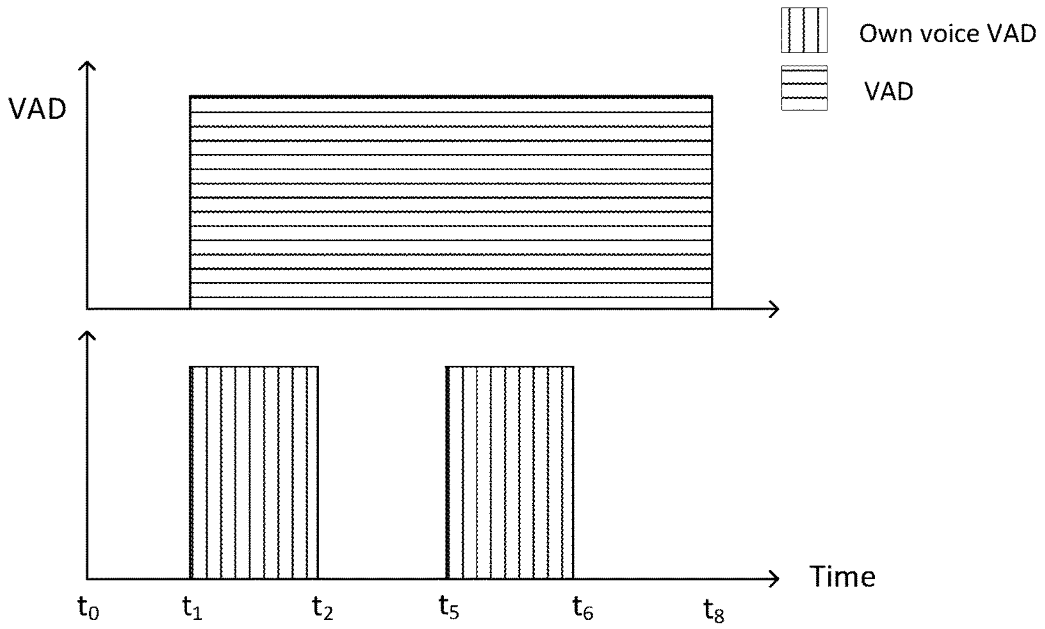

FIG. 3C illustrates how the exemplary voice activity of FIG. 3B may be detected with use of an own-voice VAD and with a VAD.

The own voice VAD will detect that the user 1 is speaking in the time interval between t1 and t2 and in the time interval between t5 and t6. The VAD on the other hand will detect that speech (from both the user 1, the competing speaker 8, and the target source 2) is being generated in the entire time interval from t1 to t8.

Figure 3D:
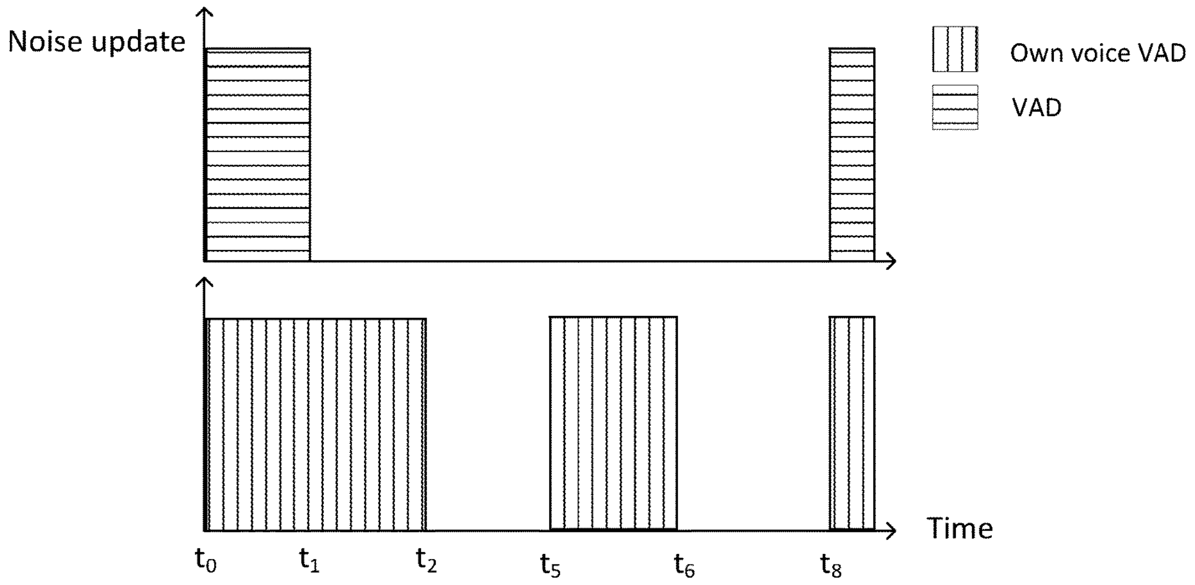

FIG. 3D illustrates the time intervals at which the hearing device would be able to update a noise reduction system for providing an estimate of said target speech signal and at least partially attenuating the noise signal components 3, including the competing speaker signal.

In a classical approach in which the VAD may be used to detect the presence of speech, the noise reduction system of the hearing device would only be updated at times where no speech is generated (both from the user 1, the competing speaker 8, and from the target source 2), as the VAD is not able to distinguish between speech from the user 1, the competing speaker 8, and from the target source 2. Accordingly, only at times where the VAD does not detect speech, i.e. from t0 to 1 and from t8 ongoing, the noise reduction system will be updated.

With use of an own voice VAD, the noise reduction system of the hearing device may be configured to be updated not only when no speech is detected, but also when speech from the user 1 is detected by the own voice VAD, i.e. from t0 to t2, from t5 to t6, and from t8 ongoing.

Accordingly, noise signal components may be identified during time segments where said own voice detector indicates that the at least one electric input signal, or a signal derived therefrom, originates from the voice of the user 1, or originates from the voice of the user 1 with a probability above an own voice presence probability (OVPP) threshold value.

Combining the own voice VAD and the VAD in the hearing device, the noise reduction system may be configured to both detect when the user 1 is speaking and when the target source 2 and the competing speaker 8 are speaking. Thereby, the noise reduction system may be updated during time intervals where no speech signal is generated and where the user 1 is speaking, but may be prevented from updating at time intervals where the target sound source 2 is generating a target speech signal.

Figure 4A:
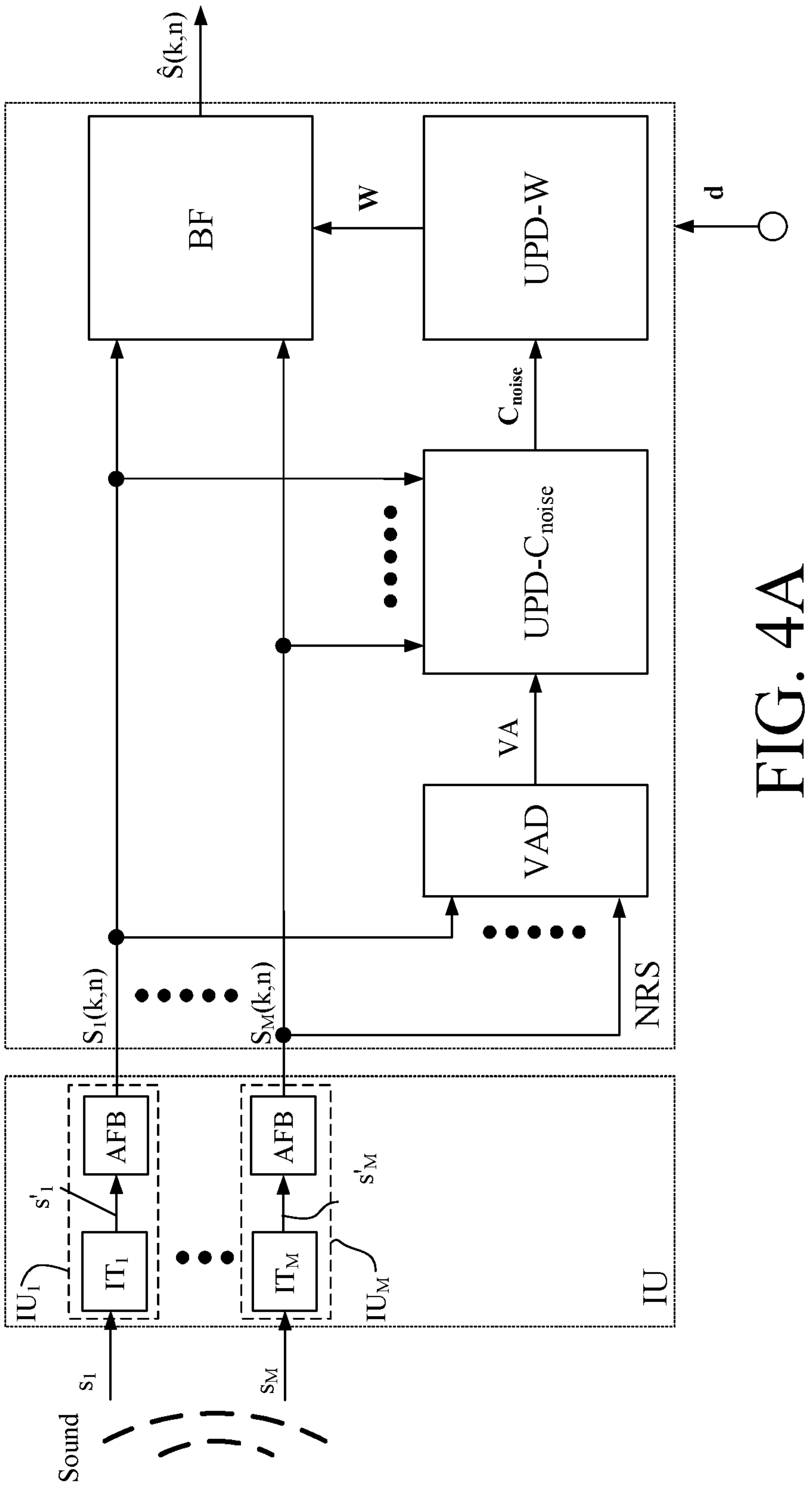
FIG. 4A shows an exemplary input unit coupled to an exemplary noise reduction system.
Figure 4B:
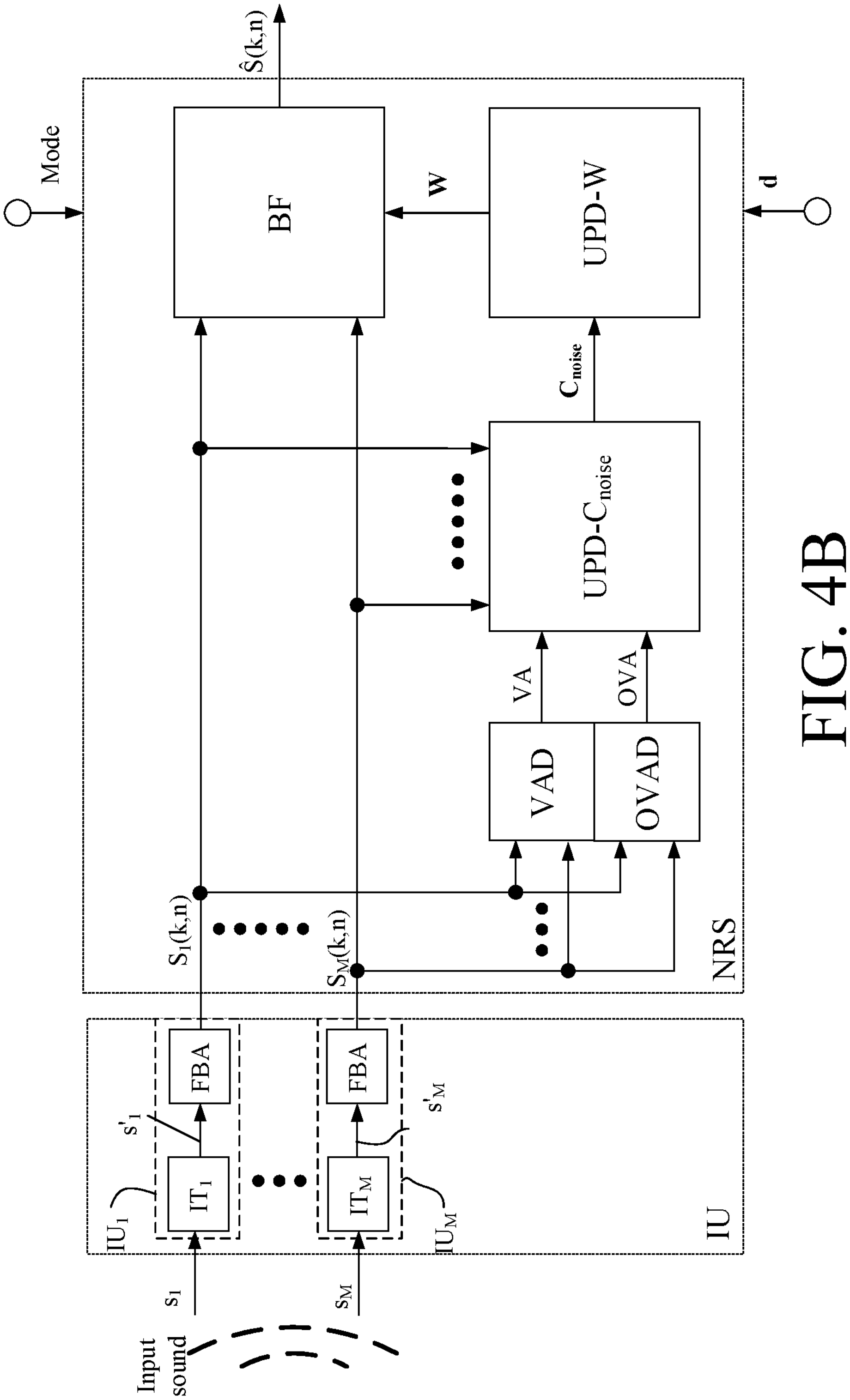
FIG. 4B shows an exemplary input unit coupled to an exemplary noise reduction system according to the present disclosure.
Figure 5A:
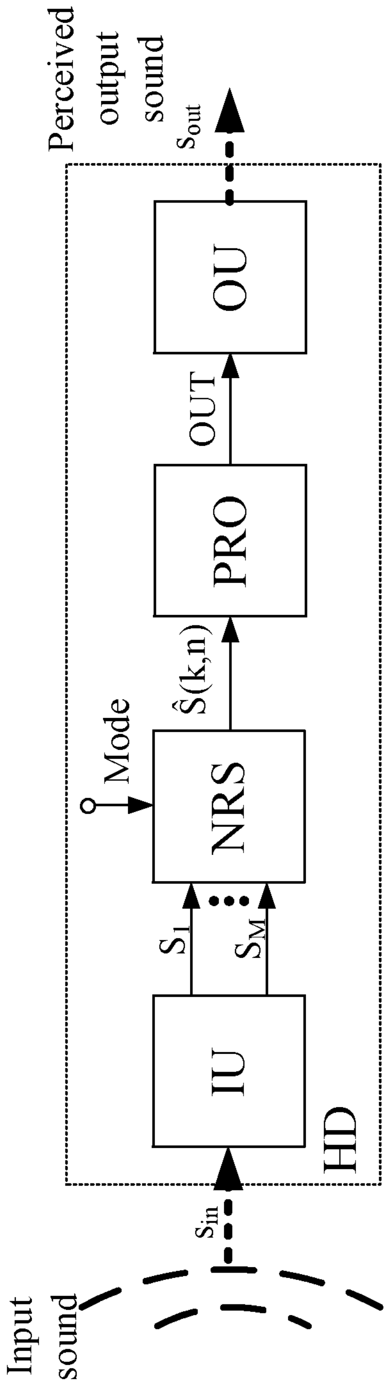
FIG. 5A shows an exemplary block diagram of a hearing aid comprising a noise reduction system according to an embodiment of the present disclosure.
Figure 5B:
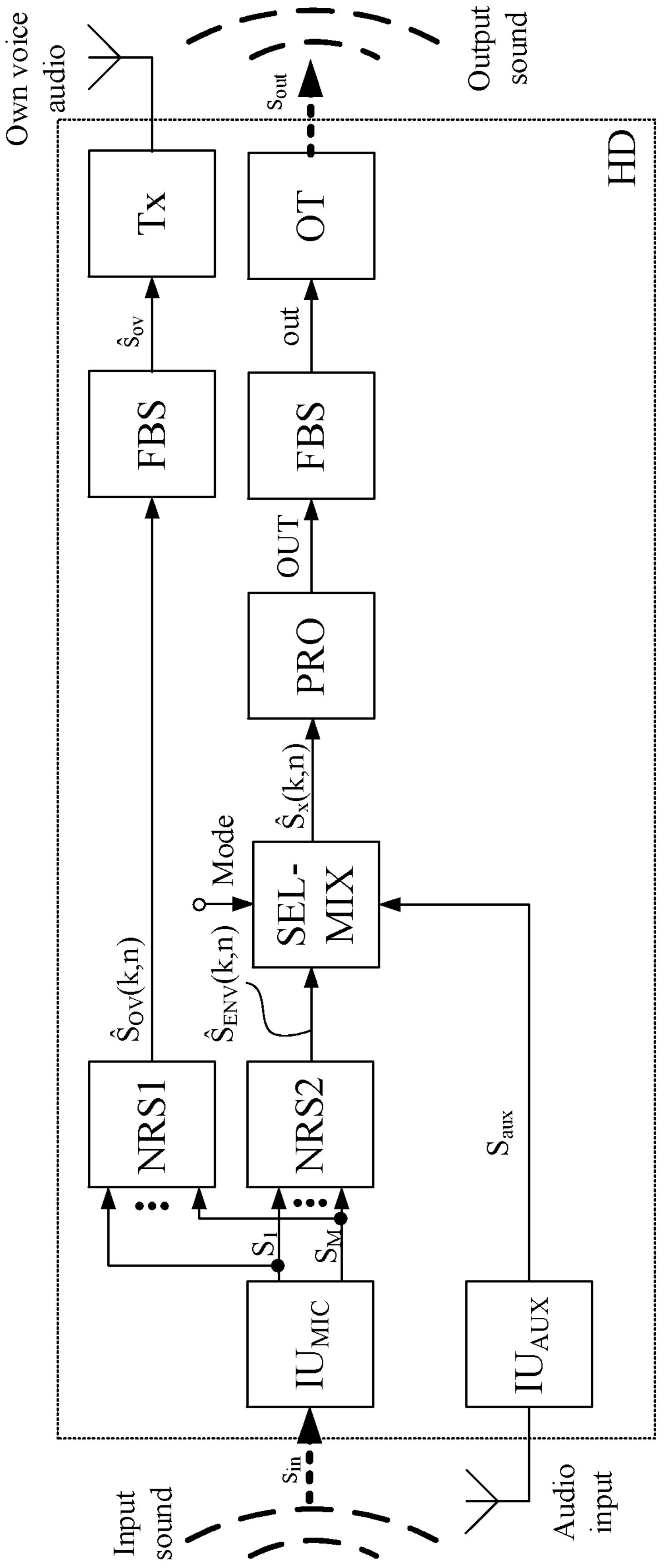
FIG. 5B shows an exemplary block diagram of a hearing aid comprising a noise reduction system according to an embodiment of the present disclosure in a handsfree telephony mode of operation.
Figure 5C:
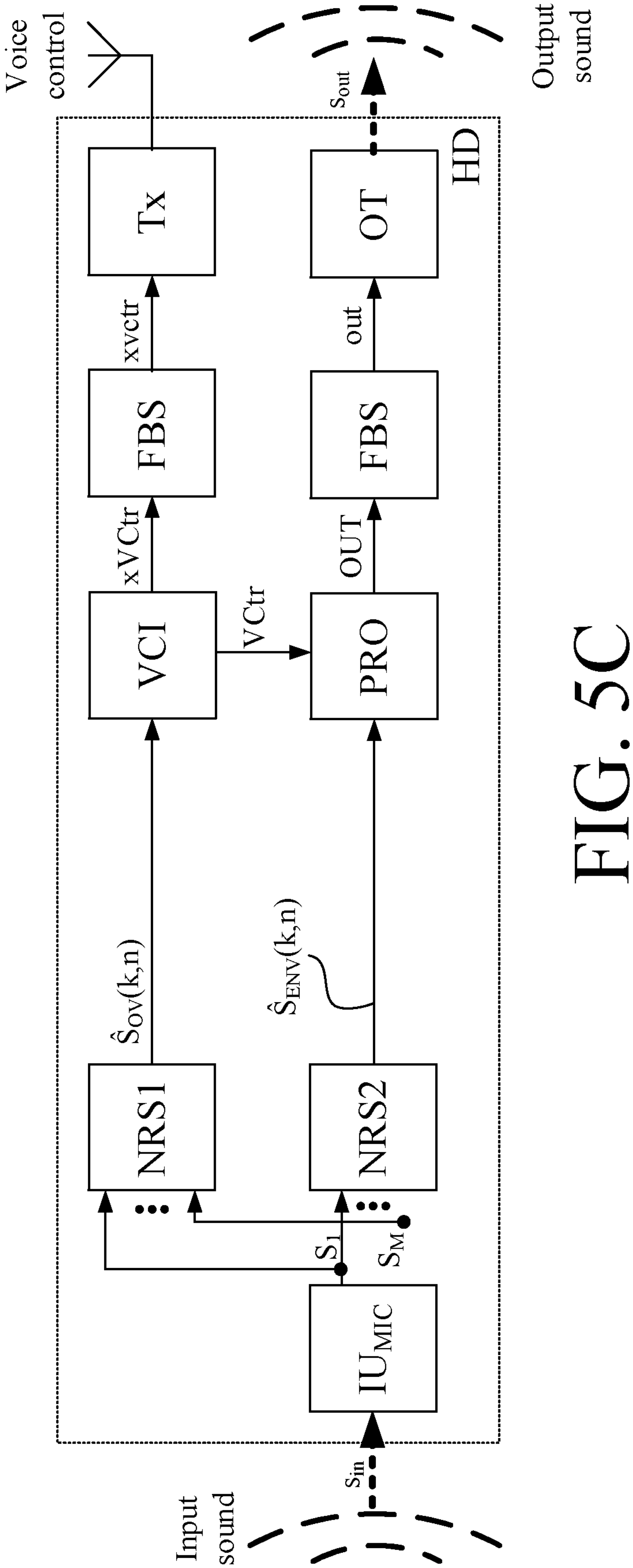
FIG. 5C shows an exemplary block diagram of a hearing aid comprising a noise reduction system according to an embodiment of the present disclosure including a voice control interface.

In FIGS. 4A and 4B a noise reduction system (NRS) is coupled to an input unit (IU) comprising M input transducers ($IT_1, \ldots, IT_M$), e.g. microphones, where M is larger than or equal to 2. The M input transducers may be located in a single hearing device, e.g. a hearing aid (e.g. located in or at an ear of a user). The M input transducers may be distributed over two (separate) hearing devices, e.g. hearing aids (e.g. in (two) hearing devices located in or at respective ears of a user). The latter configuration may form part of or constitute a binaural hearing system, e.g. a binaural hearing aid system. Each of the hearing devices of the binaural hearing aid system may comprise one or more (at least one), e.g. two or more, input transducers (e.g. microphones). A configuration of microphones of a binaural hearing aid system, wherein each hearing aid comprises two microphones, is e.g. illustrated in FIG. 6. Various embodiments of a hearing device (e.g. a hearing aid) comprising a noise reduction system according to the present disclosure are illustrated in FIGS. 5A, 5B, 5C.

FIG. 4A shows an exemplary input unit (IU) coupled to an exemplary noise reduction system. Each of the M input transducers receive (at their respective, different locations) sound signals ($s_1, \ldots s_M$) from an input sound filed (comprising environment sound). The input unit (IU) comprises M input sub-units ($IU_1, \ldots, IU_M$). Each input unit comprises an input transducer ($IT_1, \ldots, IT_M$), e.g. a microphone, for converting an input sound signal to an electric input signal ($s'_1, \ldots, s'_M$). Each input transducer may comprise an analogue-to-digital converter for converting an analogue input signal to a digital signal (with a certain sampling rate, e.g. 20 kHz, or more), Each input unit further comprises an analysis filter bank for converting a time-domain (digital) signal to a number (K, e.g. ≥16, or ≥24 or ≥64) of frequency sub-band signals ($S_1(k,n), \ldots, S_M(k,n)$), where k and n are frequency and time indices, respectively, and where $k=1, \ldots, K$). The respective electric input signals ($S_1(k,n), \ldots, S_M(k,n)$) in a time-frequency representation (k,n) are fed to the noise reduction system (NRS).

The noise reduction system (NRS) is configured to provide an estimate $\hat{S}(k,n)$ of a target speech signal (e.g. the hearing aid user's own voice, and/or the voice of a target speaker in the environment of the user), wherein noise signal components are at least partially attenuated. The noise reduction system (NRS) comprises a number of beamformers. The noise reduction system (NRS) comprises a beamformer (BF), e.g. an MVDR beamformer or a MVF beamformer, connected to the input unit (IU) and configured to receive the electric input signals ($S_1(k,n), \ldots, S_M(k,n)$) in a time-frequency representation. The beamformer (BF) is configured to provide at least one beamformed (spatially filtered) signal, e.g. the estimate $\hat{S}(k,n)$ of a target speech signal.

Directionality by beamforming is an efficient way to attenuate unwanted noise as a direction-dependent gain can cancel noise from one direction while preserving the sound of interest impinging from another direction hereby potentially improving the intelligibility of a target speech signal (thereby providing spatial filtering). Typically, beamformers in hearing devices, e.g. hearing aids, have beampatterns, which are continuously adapted in order to minimize noise components while sound impinging from a target direction is unaltered. Typically, the acoustic properties of the noise signal changes over time. Hence, the noise reduction system is implemented as an adaptive system, which adapts the directional beampattern in order to minimize the noise while the target sound (direction) is unaltered.

The noise reduction system (NRS) of FIG. 4A further comprises a voice activity detector (VAD) for repeatedly estimating whether or not, or with what probability, at least one (a majority, or all) of the electric input signals, or a signal or signals derived therefrom, comprise(s) speech. The electric input signals ($S_1$(k,n), . . . , $S_M$(k,n)), or at least one of them (or a processed, e.g. beamformed, version thereof), is/are fed to the VAD, and based thereon, a voice activity signal (VA) indicative of whether or not, or with what probability, the electric input signal or signals or processed versions thereof contains speech, is provided. The VA is fed to the update unit (UPD-$C_{noise}$) for updating noise covariance matrices $C_{noise}$. The noise covariance matrices are determined (at a given point in time) from the (noisy) electric input signals ($S_1$(k,n), . . . , $S_M$(k,n)) in the absence of speech (assuming that only noise is present in the sound field at such time instants). An updated noise covariance matrix $C_{noise}$(k,n) is used by the update filter weights unit (UPD-W), wherein updated filter weights W(k,n) at the given time instant when the noise covariance matrix was updated are determined based on the latest noise covariance matrix $C_{noise}$(k,n) and an estimate of current relative or absolute acoustic transfer functions (e.g. arranged in a look vector d(k,m)) from the target sound source to the respective input transducers of the input unit (RI) of the hearing system (or device)). The calculation of the noise covariance matrix $C_{noise}$(k,n) and the beamformer weights W(k,n) is known from the prior art and e.g. described in [11] and/or in EP2701145A1. The updated beamformer weights W(k,n) are applied to the electric input signals ($S_1$(k,n), . . . , $S_M$(k,n)) in the beamformer (BF), whereby an estimate $\hat{S}$(k,n) of the target signal is provided.

FIG. 4B shows an exemplary input unit (IU) coupled to an exemplary noise reduction system (NRS) according to the present disclosure. The embodiment of FIG. 4B is equal to the embodiment of FIG. 4A in that it contains the same functional elements as the embodiment of FIG. 4A. Additionally, however, it contains an own voice detector (OVAD) for repeatedly estimating whether or not, or with what probability, at least one (a majority, or all) of the electric input signals ($S_1$, $S_M$), or a signal derived therefrom, comprises speech originating from the voice of the user. Some acoustic events have distinct directional beampatterns, which can be distinguished from other acoustic events. A hearing device user's own voice is an example of such an event. This is utilized in the present disclosure. By simultaneously monitoring (general) voice presence (indicated by voice activity signal VA from the VAD) and (specifically) own voice presence (indicated by own voice activity signal OVA from the OVAD), another scheme (than general voice absence) for identifying appropriate time segments for updating the noise covariance matrix $C_{noise}$(k,n) can advantageously be used. As shown in the examples of FIG. 1D, 2D, 3D, the noise reduction system according to the present disclosure is configured to update the noise covariance matrix $C_{noise}$(k,n) during own voice speech activity (and possibly during general speech absence). The update unit (UPD-$C_{noise}$) may e.g. comprise an own voice cancelling beamformer configured to cancel (or attenuate) sounds from the user's mouth, while leaving sounds from other directions un-changed (or less attenuated). The update filter weights unit (LTPD-W) may include the function of a (single channel) post filter in that—in addition to spatial filtering of the target signal—noise components are further attenuated by the own-voice cancelling beamformer of the update unit (UPD-$C_{noise}$). The update filter weights unit (UPD-W) may receive or calculate own voice transfer functions (mouth to microphones), e.g. arranged in a look vector d (cf. input d). The look vector may be determined in advance of or during operation of the hearing device. The look vector may be used in determining the current filter weights. The look vector may represent transfer functions or relative transfer functions to the user's own voice or to an external target sound source, e.g. a target speaker in the environment. Look vectors for the user's own-voice as well as for an environment target speaker may be provided to or adaptively determined by the noise reduction system. The noise reduction system (NRS) may comprise a mode select input (Mode) configured to indicate a mode of operation of the system, e.g. of the beamformer(s) and/or the updating strategy, e.g. whether the target signal is the user's own voice or a target signal from the environment of the user (and possibly to indicate a direction to or location of such target sound source). The mode control signal may e.g. be provided from a user interface, e.g. from a remote control device (e.g. implemented as an APP of a smartphone or similar device, e.g. a smartwatch or the like). The user interface may comprise a voice control interface (see e.g. FIG. 5C). The mode control signal (Mode) may e.g. be automatically generated, e.g. using one or more sensors, e.g. initiated by the reception of a wireless signal, e.g. from a telephone). The output of the beamformer (BF) may be an estimate of the user's voice $\hat{S}_{OV}$, or an estimate of a target sound from the environment $\hat{S}_{ENV}$,see e.g. FIG. 5B.

FIG. 5A shows an exemplary block diagram of a hearing device, e.g. a hearing aid (TH)), comprising a noise reduction system (NRS) according to an embodiment of the present disclosure. The hearing device comprises an input unit (IU) for picking up sound $s_{in}$ from the environment and providing a multitude (M) of electric input signals ($S_1$, . . . , $S_M$) and a noise reduction system (NRS) for estimating a target signal $\hat{S}$ in the input sound $s_{in}$ based on the electric input signals and optionally further information (e.g. the mode control signal (Mode)) as described in connection with FIGS. 4A, 4B. The hearing aid further comprises a processor (PRO) for applying one or more processing algorithms to a signal of the forward path from input to output transducer (e.g. as here to the estimate $\hat{S}$ of the target signal, provided in a time-frequency representation $\hat{S}$(k,n)). The one or more processing algorithms may e.g. comprise a compression algorithm configured to amplify (or attenuate) a signal according to the needs of the user, e.g. to compensate for a hearing impairment of the user. Other processing algorithms may include frequency transposition, feedback control, etc. The processor provides a processed output (OUT) that is fed to an output unit (OU) for converting output signal (out) to stimuli $s_{out}$ perceivable by the user as sound (Perceived output sound), e.g. acoustic vibrations (e.g. in air and/or skull bone) or electric stimuli of the cochlear nerve. In a non-hearing aid, e.g. headset application, the processor may be configured to further enhance the signal from the noise reduction system or be dispensed with (so that the estimate $\hat{S}$ of the target signal is fed directly to the output unit), The target signal may be the user's own voice, and/or a target sound in the environment of the user (e.g. a person (other than the user) speaking, e.g. communicating with the user).

FIG. 5B shows an exemplary block diagram of a hearing device, e.g. a hearing aid (HD), comprising a noise reduction system (NRS) according to an embodiment of the present disclosure in a handsfree telephony mode of operation. The embodiment of FIG. 5B comprises the functional blocks described in connection with the embodiment of FIG. 5A. Specifically, however, the embodiment of FIG. 5B is configured—in a particular communication mode—to implement a wireless headset allowing a user to conduct a spoken communication with a remote communication partner. In the particular communication mode of operation (e.g. a telephone mode), the hearing aid is configured to pick up a user's voice using electric input signals provided by the input unit ($IU_{MIC}$) and to provide an estimate $\hat{S}_{OV}(k,n)$ of the user's voice using a noise reduction system NRS1 according to the present disclosure, and to transmit the estimate (Own voice audio) to a another device (e.g. a telephone or similar device)) or system via a synthesis filter bank (PBS) and appropriate transmitter (Tx) and antenna circuitry. Additionally, the hearing aid (HD) comprises an auxiliary audio input (Audio input) configured to receive a direct audio input (e.g. wired or wirelessly) from another device or system, e.g. a telephone (or similar device). In the embodiment of FIG. 5B, a wirelessly received input (e.g. a spoken communication from a communication partner) is shown to be received by the hearing aid via antenna and input unit ($IU_{AUX}$). The auxiliary input unit ($IU_{AUX}$) comprises appropriate receiver circuitry, an analogue-to-digital converter (if appropriate), and an analysis filter bank to provide audio signal, $S_{aux}$, in a time-frequency representation as frequency sub-band signals $S_{aux}(k,n)$. The forward path of the hearing aid of FIG. 5B comprises the same components as described for the embodiment of FIG. 5A and additionally a selector-mixer (SEL-MIX) allowing the signal of the forward path (which is processed in the processor (PRO) and presented to the user as stimuli perceivable as sound) to be configurable. In control of the Mode control signal (Mode), the output $S_x(k,n)$ of the selector-mixer (SEL-MIX) can be a) the environment signal $S_{ENV}(k,n)$ (e.g. an estimate of a target signal in the environment, or an omni-directional signal, e.g. from one of the microphones), b) the auxiliary input signal $S_{aux}(k,n)$ from another device, or c) a mixture (e.g. a (possibly configurable, e.g. via a user interface) weighted mixture) thereof. Further, compared to the embodiment of FIG. 5A, the forward path of the embodiment of FIG. 5B comprises synthesis filter bank (FBS) configured to convert a signal in the time-frequency domain, represented by a number of frequency sub-band signals (here signal OUT(k, n) from the processor (PRO) to a signal (out) in the time domain. The hearing aid (forward path) further comprises an output transducer (OT) for converting output signal (out) to stimuli ($s_{out}$) perceivable by the user as sound (output sound), e.g. acoustic vibrations (e.g. in air and/or skull bone). The output transducer (OT) may comprise a digital-to-analogue converter as appropriate.

The first noise reduction system (NRS1) is configured to provide an estimate of the user's own voice $\hat{S}_{OV}$. The first noise reduction system (NRS1) may comprise an own voice maintaining beamformer and an own voice cancelling beamformer. The own voice cancelling beamformer comprises the noise sources when the user speaks.

The second noise reduction system (NRS2) is configured to provide an estimate of a target sound source (e.g. a voice $\hat{S}_{ENV}$ of a speaker in the environment of the user). The second noise reduction system (NRS2) may comprise an environment target source maintaining beamformer and an environment target source cancelling beamformer, and/or an own voice cancelling beamformer. The target cancelling beamformer comprises the noise sources when the target speaker speaks. The own voice cancelling beamformer comprises the noise sources when the user speaks.

FIG. 5B may represent an ordinary headset application, e.g. by separating the microphone to transmitter path ($IU_{MIC}$-Tx) and the direct audio input to loudspeaker r path ($IU_{AUX}$-OT). This may be done in several ways, e.g. by removing the second noise reduction system (NRS2) and the selector mixer (SEL,MIX), and possibly the synthesis filter bank (MS) (if the auxiliary input signal $S_{aux}$ is processed in the time domain), to feed the auxiliary input signal $S_{aux}$ directly to the processor (PRO), which may or (generally) may not be configured to compensate for a hearing impairment of the user.

FIG. 5C shows an exemplary block diagram of a hearing aid comprising a noise reduction system according to an embodiment of the present disclosure including a voice control interface. The embodiment of FIG. 5C comprises a forward path as the embodiment of FIG. 5B, except that the option of including an (e.g. wirelessly received) auxiliary audio signal in the beamformed signal composed by the electric input signals from the input transducers is omitted in the embodiment of FIG. 5C. In another embodiment, the embodiments of FIG. 5B and 5C may be mixed so that the hearing aid of FIG. 5C additionally comprises the auxiliary input from another device and the option of transmitting the own voice signal to the other device (to implement a communication mode) may be implemented as well. The initiation (or termination) of the communication mode (e.g. telephone mode) may e.g. be provided via the voice interface, e.g. voice control signal Vctr. In the embodiment of FIG. 5C, the estimate of the user's own voice $\hat{S}_{OV}$ provided by the first noise reduction system (NRS1) is used as input to the voice control interface (VCI). The voice control interface (VCI) may e.g. be activated in dependence of the detection of a wake-word (spoken by the user and extracted from the estimate $\hat{S}_{OV}$ of the user's voice). When the voice control interface is activated, a command word among a number of predefined command words may be extracted, and a control signal (VCtr, xVCtr) may be generated in dependence thereof. Functionality of the hearing aid (e.g. implemented by the processor (PRO) may be controlled via the voice interface (VCI), cf. signal Vctr. Extracted wake-words (e.g. 'Hey Siri', 'Hey Google' or 'OK Google', 'Alexa', 'X Oticon', etc.) and/or command words may be transmitted to another device (e.g. to a smartphone or other voice-controllable devices), cf control signal xvctr that is transmitted to another device via (optional synthesis filter bank, FBS) and antenna and transmitter circuitry (Tx).

EXAMPLE 1

In the present application, a maximum likelihood estimator of the noise CPSD matrix that overcomes the limitation of the method presented [1,4] (e.g. when a prominent interference is present in the acoustic environment) is disclosed. It is proposed to extend the noise CPSD matrix model. In the following, the signal model of the noisy observations in the acoustic scene is presented. Based on the signal model, the proposed ML estimator of the interference-plus-noise CPSD matrix is derived, and the proposed method is exemplified by application to own voice retrieval.

Figure 6:
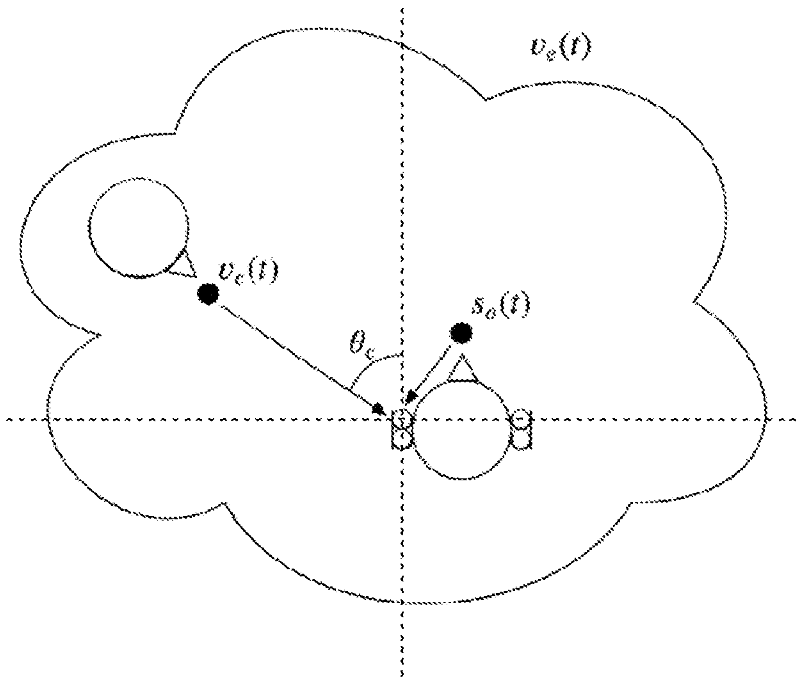
FIG. 6 shows an exemplary application scenario of a hearing device system according to the present disclosure.

The acoustic scene consists of a user equipped with heating aids or a headset with access to at least M>2 microphones. The microphones pick up the sound from the environment and the noisy signal is sampled into a discrete sequence $x_m(t) \in \mathbb{R}$; $t \in \mathbb{N}_0$ for all m=1, . . . , M microphones. As illustrated in FIG. 6, the user is active in the acoustic scene, and the desired, clean speech signal produced by the user, which we refer to the own voice, is defined as the discrete sequence $s_o(t)$. The interference is modelled as a point source referred to as $v_c(t)$ and the noise in the acoustic environment is $v_{e,m}(t)$. The noisy signal picked up by the microphones is then a sum of all three components i.e.

$$x_m(t)=s_o(t)*d_{o,m}(t)+v_c(t)*d_m(t,\theta_c)+v_{e,m}(t), \quad (1)$$

where * denotes the convolution, $d_{o,m}(t)$ is the relative impulse response between the m'th microphone and the own-voice source, $d_m(t, \theta_c)$ is the relative impulse response between m'th microphone and the interference arriving from direction $\theta_c \in \Theta$, where we without loss of generality assume that $\Theta$ is a discrete set of directions $\Theta=\{-180°, \ldots, 180\}$ with I elements. An illustration of the acoustic scene is shown in FIG. 7. The objective of the noise reduction system is then to retrieve $s_o(t)$ from the noisy Observation $x_m(t)$.

We apply the short-time Fourier transform (SDI) on $x_m(t)$ to transform the noisy signal into the time-frequency (TF) domain with frame length T, decimation factor D, and analysis window $w_A(t)$ such that $$x_m(k, n) = \sum_{t=0}^{T-1} w_A(t)x(t-nD)\exp\left(-\frac{j2\pi kt}{T}\right), \quad (2)$$

is the TF domain representation of the noisy signal where $j=\sqrt{-1}$, k is the frequency bin index, and n is the frame index. The signal model for the noisy observation in the TF domain then becomes $$x_m(k,n)=s_o(k,n)d_{o,m}(k,n)+v_c(k,n)d_m(k,n,\theta_c)+v_{c,m}(k,n), \quad (3)$$

and for convenience, we vectorize the noisy observation such that $x(k, n)=[x_1(k, n), \ldots, x_M(k, n)]^T$ and $$x(k, n) = s_o(k, n)d_o(k, n) + \underbrace{v_c(k, n)d(k, n, \theta_c) + v_e(k, n)}_{v(n,k)}. \quad (4)$$

We further assume that the relative transfer function (RTF) vectors (i.e. $d_o(k, n)$ and $d(k, n, \theta_c)$) remain identical over time so we may define $d_o(k) \triangleq d_o(k, n)$ and $d(k, \theta_c) \triangleq d(k, n, \theta_c)$. In practice, it is often the case that $s_o(k, n)$, $v_c(k, n)$, and $v_e(k, n)$ are uncorrelated random processes meaning that the CPSD matrix of the noisy observations, i.e. $C_x(k, n)=\mathbb{E}\{x(k, n)x^H(k, n)\}$, is given as $$C_x(k, n) = \lambda_s(k, n)d_o(k)d_o^H(k) + \underbrace{\lambda_c(k, n)d(k, \theta_c)d^H(k, \theta_c) + \lambda_c(k, n)\Gamma_e(k, n)}_{C_V(n,k)}, \quad (5)$$

where $\lambda_s(k, n)$, $\lambda_c(k, n)$, and $\lambda_e(k, n)$ are power spectral densities (PSDs) of the own-voice, interference, and noise respectively. $\Gamma_e(k, n)$ is the normalized noise CPSD matrix with 1 at the reference microphone index and we assume that $\Gamma_e(k, n)$ is a known matrix, but can for approximately isotropic noise fields be modelled as $$\Gamma_c(k, n) = \sum_{i=1}^{I} d(k, \theta_i)d^H(k, \theta_i). \quad (6)$$

We assume that the own voice RTF vector $d_o(k)$ is known, as it can be measured in advance before deployment. The parameters that remain to be estimated are $\lambda_c(k, n)$, $\lambda_e(k, n)$, and $\theta_c$ and the proposed ML estimators of these parameters will in the following section be presented.

To estimate the interference-plus-noise PSDs $\lambda_c(k, n)$ and $\lambda_e(k, n)$ and the interference direction $\theta_c$, we first apply an own voice cancelling beamformer to obtain an interference-plus-noise-only signal (e.g. the signals from the own voice and from a competing speaker). The own voice cancelling beamformer is implemented using an own voice blocking matrix $B_o(k)$. A common approach to find the own voice blocking matrix, is to first find the orthogonal $$B_o(k) = \left(I_{M\times M} - \frac{d_o(k)d_o^H(k)}{d_o^H(k)d_o(k)}\right)I_{M\times M-1}, \quad (7)$$

projection matrix of $d_o(k)$ and then select the first M−1 column vectors of the projection matrix. More explicitly, let $I_{M\times M}$ be an M×M identity matrix then $I_{M\times M-1}$ is the first M−1 column vectors of $I_{M\times M}$. The own voice blocking matrix is then given as where $B_o(k) \in \mathbb{C}^{M\times M-1}$. The own voice blocked signal, z(k, n), can be expressed as $$\begin{aligned} z(k, n) &= B_o^H(k)x(k, n) \quad (8)\\ &= s_c(k, n)\underbrace{B_o^H(k)d_c(k, \theta_c)}_{\tilde{d}(k,\theta_c)} + \underbrace{B_o^H(k)v_e(k, n)}_{\tilde{v}_e(k,n)} \end{aligned}$$

and the own voice blocked CPSD matrix is $$C_z(k,n)=\lambda_c(k,n)\tilde{d}(k,\theta_c)\tilde{d}^H(k,\theta_c)+\lambda_e(k,n)\tilde{\Gamma}_e(k,n). \quad (9)$$

Before presenting the ML estimators of $\lambda_c(k, n)$, $\lambda_e(k, n)$, and $\theta_c$, we introduce the own voice-plus-interference blocking matrix $\tilde{B}(\theta_i)$.

This step is necessary as the ML estimator of the noise PSD, $\lambda_e(k, n)$, further requires that the interference is removed from the own voice blocked signal z(k, n). Forming the own-voice-plus-interference blocking matrix follows similar procedure as forming the own voice blocking matrix. The own voice-plus-interference blocking matrix can be found as $$\tilde{B}(\theta_i) = \left(I_{M-1\times M-1} - \frac{B_o^H d(k, \theta_i)d^H(k, \theta_i)B_o}{d^H(k, \theta_i)B_oB_o^H d(k, \theta_i)}\right)I_{M-1\times M-2}, \quad (10)$$

where $\tilde{B}(\theta_i) \in \mathbb{C}^{M-1\times M-2}$ The own voice-plus-interference blocking matrix $\tilde{B}(\theta_i)$ is a function of direction, as the direction of the interference is generally unknown. The own voice-plus-interference blocked signal is then $$
\begin{aligned}
q(n, k) &= \tilde{B}^H(\theta_i)z(k, n) \\
&= s_c(k, n)\tilde{B}^H(\theta_i)\tilde{d}(k, n, \theta_c) + \tilde{B}^H(\theta_i)\tilde{v}_e(k, n) \\
&= \tilde{B}^H(\theta_i)v_e(k, n), \text{ if } \theta_i = \theta_c,
\end{aligned}
\tag{11}
$$

and the blocked own voice-plus-interference CPSD matrix is $$
\begin{aligned}
C_q(k, n) &= \tilde{B}^H(\theta_i)C_z(k, n)\tilde{B}(\theta_i) \\
&= \lambda_e(k, n)\tilde{B}^H(\theta_i)\tilde{\Gamma}_e(k, n)\tilde{B}(\theta_i),
\end{aligned}
\tag{12}
$$

only if $\theta_i = \theta_c$.

It is common to assume that the own-voice, interference, and noise are temporally uncorrelated [6]. Under this assumption, the blocked own voice-plus-interference signal is distributed according to a circular symmetric complex Gaussian distribution i.e. $z(k, n) \sim \mathcal{N}_C(0, C_z(k, n))$, meaning that, the likelihood function for N observations of z(k, n) with $Z(k, n)=[z(k, n-N+1), \ldots, z(k, n)] \in \mathbb{C}^{M-1\times N}$ is given as $$
f(Z(k, n) \mid \theta_i, \lambda_c(k, n), \lambda_e(k, n)) = \frac{\exp\left(-Ntr\left(\hat{C}_z(k, n)C_z^{-1}(k, n, \theta_i)\right)\right)}{\pi^{MN}|C_z(k, n, \theta_i)|^N},
\tag{13}
$$

where tr(·) denotes the trace operator and $$
\hat{C}_z(k, n) = \frac{1}{N}Z(k, n)Z^H(k, n)
$$

is the sample estimate of the own voice blocked CPSD matrix. ML estimators of the interference-plus-noise PSDs $\lambda_c$ (k, n) and $\lambda_e$ (k, n) have been derived in [1,4]. The ML estimator of $\lambda_e$(k, n) is given as $$
\hat{\lambda}_e(k, n, \theta_i) = \frac{1}{M\times 2}\times tr\left(\hat{C}_q(k, n, \theta_i)\left(\tilde{B}^H(\theta_i)\tilde{\Gamma}_e(k, n)\tilde{B}(\theta_i)\right)^{-1}\right),
\tag{14}
$$

with $$
\hat{C}_q(k, n) = \frac{1}{N}\tilde{B}^H(\theta_i)Z(k, n)Z^H(k, n)\tilde{B}(\theta_i)
$$

being the sample covariance of the own voice-plus-interference blocked signal and the ML estimator of the interference PSD is then given as [7]

$$
\hat{\lambda}_c(k,n,\theta_i)=\tilde{w}^H(\theta_i)(\hat{C}_z(k,n)-\hat{\lambda}_e(k,n,\theta_i)\tilde{\Gamma}_e(k,n))\tilde{w}(\theta_i),
\tag{15}
$$

where $\tilde{w}(\theta_i)$ is the MVDR beamformer constructed from the blocked own voice CPSD matrix i.e.

$$
\tilde{w}(\theta_i) = \frac{\tilde{\Gamma}_e^{-1}(k, n)d_o(k)}{d_o^H(k)\tilde{\Gamma}_e^{-1}(k, n)d_o(k)}.
\tag{16}
$$

Inserting the ML estimates $\hat{\lambda}_e(k, n, \theta_i)$ and $\hat{\lambda}_c(k, n, \theta_i)$ into the likelihood function, we obtain the concentrated likelihood function $\mathfrak{f}(Z(k, n)|\theta_i, \hat{\lambda}_c(k, n, \theta_i), \hat{\lambda}_e(k, n, \theta_i))$ which we simplify to $\mathfrak{f}(Z(k, n)|\theta_i)$. It is common to maximize the log-likelihood function by applying the natural logarithmic function to the concentrated likelihood function. It can then be shown that the concentrated log-likelihood function is proportional to [8,9]

$$
\ln \mathfrak{f}(Z(k,n)|\theta_i) \propto -|\hat{\lambda}_c(k,n,\theta_i)\tilde{d}(k,\theta_i)\tilde{d}(k,\theta_i)^H+\hat{\lambda}_e(k,n,\theta_i)\tilde{\Gamma}_e(k,n)|.
\tag{17}
$$

Under the assumptions that only one single interference is present in the acoustic environment and that the noisy observations across frequency bins are uncorrelated, then a wideband concentrated log-likelihood function can be derived as $$
\ln\mathfrak{f}(Z(1, n), \ldots, Z(K, n) \mid \theta_i) = \sum_{k=1}^{K}\ln\mathfrak{f}(Z(k, n) \mid \theta_e),
\tag{18}
$$

where K is the total number of frequency bins of the one-sided spectrum. To obtain the ML estimate of the interference direction, we maximize the function $$
\hat{\theta}_c = \underset{\theta_x\in\Theta}{\arg\max}\ln\mathfrak{f}(Z(1, n), \ldots, Z(K, n) \mid \theta_i).
\tag{19}
$$

As $\theta_i$ belongs to a discrete set of directions, the ML estimate of $\theta_c$ is obtained through an exhaustive search over $\theta_i$. Finally, to obtain an estimate of the interference-plus-noise CPSD matrix we insert the ML estimates into the interference-plus-noise CPSD model i.e.

$$
\hat{C}_v(k,n)=\hat{\lambda}_c(k,n,\hat{\theta}_c)d(k,\hat{\theta}_c)d^H(k,\hat{\theta}_c)+\hat{\lambda}_e(k,n,\hat{\theta}_c)\Gamma_e(k,n).
\tag{20}
$$

For own voice retrieval, we implement the MWF beamformer. It is well-known that the MWF can be decomposed into an MVDR beamformer and a single channel post Wiener filter [10]. The MVDR beamformer is given as $$
w_{MVDR}(k, n) = \frac{\hat{C}_v^{-1}(k, n)d_o(k)}{d_o^H(k)\hat{C}_v^{-1}(k, n)d_o(k)},
\tag{21}
$$

and the single-channel post Wiener filter is

The MWF beamformer coefficients are then found as $$
w_{MWF}(k, n) = w_{MVDR}(k, n)\cdot g(k, n).
\tag{23}
$$

$$
g(k, n) = \left(1 - \frac{w_{MVDR}^H(k, n)C_v(k, n)w_{MVDR}(k, n)}{w_{MVDR}^H(k, n)\hat{C}_x(k, n)w_{MVDR}(k, n)}\right).
\tag{22}
$$

$$
y(k, n) = w_{MWF}^H(k, n)x(k, n).
\tag{24}
$$

Finally, the own voice signal can be estimated as a linear combination of the noisy observations using the beamformer weights i.e.

The enhanced TF domain signal, y(k, n) is then transformed back into the time domain using the inversion STFT, such that y(t) is the retrieved own voice time domain signal.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily, apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

REFERENCES

[1] U. Kjems and J. Jensen, "Maximum likelihood based noise covariance matrix estimation for multimicrophone speech enhancement," in 2012 Proceedings of the 20th European Signal Processing Conference (EUSIPCO), August 2012, pp. 295-299.

[2] Yujie Gu and A. Leshem, "Robust Adaptive Beamforming Based on Interference Covariance Matrix Reconstruction and Steering Vector Estimation," IEEE Transactions on Signal Processing, vol. 60, no. 7, pp. 3881-3885, July 2012.

[3] Richard C. Hendriks and Timo Gerkmann, "Estimation of the noise correlation matrix," in 2011 IEEE International Conference on Acoustics. Speech and Signal Processing (ICASSP), Prague, Czech Republic, May 2011, pp. 4740-4743, IEEE.

[4] Jesper Jensen and Michael Syskind Pedersen, "Analysis of beamformer directed single-channel noise reduction system for hearing aid applications," in 2015 IEEE International Conference on Acoustics, Speech and Signal Processing (ICASSP), South Brisbane, Queensland, Australia, April 2015, pp. 5728-5732, IEEE.

[5] Mehrez Souden, Jingdong Chen, Jacob Benesty, and Sofi'ene Affes, "An Integrated Solution for Online Multichannel Noise Tracking and Reduction," IEEE Transactions on Audio, Speech, and Language Processing, vol. 19, no. 7, pp. 2159-2169, September 2011.

[6] K. L. Bell, Y. Ephraim, and H. L. Van Trees, "A Bayesian approach to robust adaptive beamforming," IEEE Transactions on Signal Processing, vol. 48, no. 2, pp. 386-398, February 2000.

[7] Adam Kuklasinski, Simon Doclo, Tinto Gerkmann, Soren Holdt Jensen, and Jesper Jensen, "Multi-channel PSD estimators for speech dereverheration—A theoretical and experimental comparison," in 2015 IEEE International Conference on Acoustics, Speech and Signal Processing (ICASSP), South Brisbane, Queensland, Australia, April 2015, pp. 91-95, IEEE.

[8] Mehdi Zohourian, Gerald Enzner, and Rainer Martin, "Binaural Speaker Localization Integrated Into an Adaptive Beamformer for Hearing Aids," IEEE/ACM Transactions on Audio, Speech, and Language Processing, vol. 26, no. 3, pp. 515-528, March 2018.

[9] Hao Ye and D. DeGroat, "Maximum likelihood DOA estimation and asymptotic Cramer-Rao bounds for additive unknown colored noise," IEEE Transactions on Signal Processing, vol. 43, no. 4, pp. 938-949, April 1995.

[10] Michael Brandstein and Darren Ward, Microphone Arrays: Signal Processing Techniques and Applications, 2001.

[11] EP2701145A1 (Retune, Oticon) 26 Feb. 2014

The invention claimed is:

1. A hearing device adapted for being located at or in an ear of a user, the hearing device comprising an input unit for providing at least one electric input signal representing sound in an environment of the user, said electric input signal comprising a target speech signal from a target sound source and additional signal components, termed noise signal components, from one or more other sound sources, a noise reduction system for providing an estimate of said target speech signal, wherein said noise signal components are at least partially attenuated, a movement detector configured to detect movement due to speech of the user and to provide a detector signal indicative thereof, a voice activity detector for repeatedly estimating whether or not, or with what probability, said at least one electric input signal, or a signal derived therefrom, comprises speech, and said hearing aid is configured to provide that said noise signal components are detected during time intervals where said movement detector detects movement due to speech of the user.

2. The hearing device according to claim 1, wherein the input unit comprises at least one microphone, each of the at least one microphone providing an electric input signal comprising said target speech signal and said noise signal components.

3. The hearing device according to claim 2 comprising one or more beamformers, and wherein the input unit is configured to provide at least two electric input signals connected to the one or more beamformers, and wherein the one or more beamformers are configured to provide at least one beamformed signal.

4. The hearing device according to claim 2, wherein said noise signal components are additionally identified during time segments wherein said voice activity detector indicates an absence of speech in the at least one electric input signal, or a signal derived therefrom, or a presence of speech with a probability below a speech presence probability (SPP) threshold value.

5. The hearing device according to claim 1 comprising a classification unit configured to classify a current situation based on said detector signal from said movement detector.

6. The hearing device according to claim 5 comprising one or more beamformers, and wherein the input unit is configured to provide at least two electric input signals connected to the one or more beamformers, and wherein the one or more beamformers are configured to provide at least one beamformed signal.

7. The hearing device according to claim 5, wherein said noise signal components are additionally identified during time segments wherein said voice activity detector indicates an absence of speech in the at least one electric input signal, or a signal derived therefrom, or a presence of speech with a probability below a speech presence probability (SPP) threshold value.

8. The hearing device according to claim 1 comprising one or more beamformers, and wherein the input unit is configured to provide at least two electric input signals connected to the one or more beamformers, and wherein the one or more beamformers are configured to provide at least one beamformed signal.

9. The hearing device according to claim 8, wherein the one or more beamformers comprises one or more own voice cancelling beamformers configured to attenuate signal components originating from the user's mouth, while signal components from all other directions are left unchanged or attenuated less.

10. The hearing device according to claim 1, wherein said noise signal components are additionally identified during time segments wherein said voice activity detector indicates an absence of speech in the at least one electric input signal, or a signal derived therefrom, or a presence of speech with a probability below a speech presence probability (SPP) threshold value.

11. The hearing device according to claim 1 comprising a voice interface for voice-control of the hearing device or other devices or systems.

12. The hearing device according to claim 1, wherein the target speech signal from the target sound source comprises an own voice speech signal from the hearing device user.

13. The hearing device according to claim 1, wherein the target sound source comprises an external speaker in the environment of the hearing device user.

14. The hearing device according to claim 1 being constituted by or comprising a hearing aid, a headset, an active ear protection device or a combination thereof.

15. A binaural hearing system comprising a first and a second hearing device as claimed in claim 1, the binaural heating system being configured to allow an exchange of data between the first and the second hearing devices.

16. A method of operating a hearing device adapted for being located at or in an ear of a user, the method comprising providing at least one electric input signal representing sound in an environment of the user, said electric input signal comprising a target speech signal from a target sound source and additional signal components, termed noise signal components, from one or more other sound sources, providing an estimate of said target speech signal, wherein said noise signal components are at least partially attenuated, detecting movement due to speech of the user and providing a detector signal indicative thereof, repeatedly estimating whether or not, or with what probability, said at least one electric input signal, or a signal derived therefrom, comprises speech, providing that said noise signal components are detected during time intervals where said movement detector detects movement due to speech of the user.

17. A non-transitory computer readable medium on which is stored a computer program comprising instructions which, when the program is executed by a computer, cause the computer to carry out the method of claim 16.

* * * * *